United States Patent
Neiger et al.

[19]

[11] Patent Number: 6,111,733
[45] Date of Patent: *Aug. 29, 2000

[54] INTELLIGENT GROUND FAULT CIRCUIT INTERRUPTER

[75] Inventors: Benjamin Neiger, New York; Bernard Gershen, Centerport; Saul Rosenbaum, East Meadow, all of N.Y.

[73] Assignee: Leviton Manufacturing Co., Inc., Little Neck, N.Y.

[*] Notice: This patent is subject to a terminal disclaimer.

[21] Appl. No.: 09/288,081

[22] Filed: Jan. 14, 1998

Related U.S. Application Data

[63] Continuation of application No. 08/790,037, Jan. 28, 1997, Pat. No. 5,715,125, which is a continuation of application No. 08/435,021, May 4, 1995, Pat. No. 5,600,524.

[51] Int. Cl.$^7$ ...................................................... H02H 9/00
[52] U.S. Cl. ................................ 361/42; 361/45; 361/115
[58] Field of Search .............................. 361/42, 45, 115, 361/93.1, 49, 50

[56] References Cited

U.S. PATENT DOCUMENTS

| | | | |
|---|---|---|---|
| 4,084,203 | 4/1978 | Dietz et al. | 361/45 |
| 5,477,412 | 12/1995 | Neiger et al. | 361/45 |
| 5,600,524 | 2/1997 | Neiger et al. | 361/42 |
| 5,715,125 | 2/1998 | Neiger et al. | 361/42 |

*Primary Examiner*—Stephen W. Jackson
*Attorney, Agent, or Firm*—Paul J. Sutton

[57] ABSTRACT

An intelligent circuit interrupt system is electrically connected between an AC source and a load for interrupting a flow of AC from the source to the load upon detection of an interrupt condition. A circuit interrupter electrically connected to phase and neutral terminals of the AC source defines the interrupt condition. A relay switch with a relay coil and phase and neutral contacts is included such that line and load ends of the phase contact are electrically connected, respectively, between the interrupt means load side phase port and a phase terminal of the load. Line and load ends of the neutral contact are electrically connected, respectively, between the interrupt neutral port and a neutral terminal of the load. The relay coil is electrically coupled between load sides of said phase and neutral contacts for controlling the contacts in response to the interrupt signal. An open-contact miswiring detector (OCMD) is electrically connected to one of the phase and neutral contacts for detecting a miswiring condition when the contacts are in an open state, and a closed-contact miswiring detector (CCMD) is electrically connected to the OCMD and to one of the neutral and phase contacts for detecting a miswiring condition when the contacts are in a closed state. A timing signal generator generates system timing signals. A test circuit electrically coupled to the interrupt means and the timing signal generator tests the interrupt means operability. An alarm circuit is electrically responsive to the test circuit, the timing signal generator, the OCMD and the CCMD for communicating an open-contact miswiring condition, a closed-contact miswiring condition, an operational failure condition, and a need for external testing condition. A power supply is electrically connected between the load ends of the phase and neutral contacts, and to the timing signal generator.

4 Claims, 10 Drawing Sheets

INTELLIGENT GROUND FAULT CIRCUIT INTERRUPTER

This Application is a continuation of U.S. patent application Ser. No. 08/790,037 filed Jan. 28, 1997, now U.S. Pat. No. 5,715,125 which in turn is a continuation of U.S. patent application Ser. No. 08/435,021 filed May 4, 1995 now U.S. Pat. No. 5,600,524. All applications and the issued patent are owned by the assignee of the instant application.

BACKGROUND OF THE INVENTION

The present invention relates to ground fault circuit interrupters (GFCIs) and, more particularly, to built in test (BIT) circuitry which increases operational reliability of GFCI devices.

Ground fault circuit interrupters (GFCIs) were developed to meet a great need for a device which is capable of detecting the presence of abnormal current flow, e.g., current flow from a phase line to ground, and immediately interrupting power to a faulted line in which the abnormal current is detected to protect persons from electric shock, fire and explosion. To thoroughly protect human life, electric circuit breakers should detect such faulted currents on the order of 3 to 50 mA corresponding to load currents ranging on the order of 10 to 100 A.

Prior to GFCI development, differential circuit breakers were known and used in certain European countries to provide ground fault protection. Differential circuit breakers include a differential transformer with a core through which two conductors of the electrical circuit being monitored pass. The two wires act essentially as primary windings. The differential transformer also includes current interrupting contacts, which, in the event of a line to ground short circuit or an abnormal leakage current to ground, are forced to a high impedance state, i.e., an open state. The state of the contacts is controlled by a semiconductor device which is energized by a secondary of the differential transformer. It was found that such devices were, however, unacceptable, due to their current sensing insensitivity and, therefore, ineffectiveness in ensuring complete protection for human life.

GFCIs evolved from differential circuit breaker technology. GFCIs developed as ground sensors including a circuit breaker connected between a power source and a load; the power source is connected to the load through the GFCI via a neutral and phase conductor. The GFCI also includes a differential transformer connected across the neutral and phase conductors. The circuit breaker is actuated when the differential transformer senses that more current is flowing into the load from the source through the phase conductor than is flowing back to the source through the neutral conductor. Primary and secondary windings are included within the differential transformer which provides a means for sensing the current. A tertiary winding is disposed proximate the neutral conductor in the vicinity of the load whereby a current is induced therein in the event of a grounding. If the induced current is large enough, the circuit breaker contacts are forced open.

Similarly, a ground fault protective system is known which includes a differential transformer comprised of a toroidal core through which each of two line conductors and a neutral conductor pass to form primary windings of at least one turn. A secondary winding of the differential transformer serves as an output winding and is connected to a GPCI circuit. A trip coil of a circuit breaker having a plurality of contacts in line with the conductors of a distribution circuit is energized with a minimum current. A pulse generator is coupled to the neutral conductor for producing a high frequency current therein upon grounding of the neutral conductor between the differential transformer and the load. The high frequency current is produced by the periodic firing of a diac when a voltage on a capacitor connected thereto is applied to the output winding. The pulses induce voltage pulses in the neutral conductor passing through the transformer core. The induced voltage pulses do not effect the current balance in the distribution system as long as the neutral conductor is not grounded on the load side of the transformer. If a grounding occurs, however, the voltage pulses produce a current in the neutral conductor which does not appear in any of the line conductors. A consequential imbalance is detected by the ground fault sensing means and causes the contacts to open, interrupting the flow of current in the distribution system.

Another known arrangement discloses an electric circuit breaker including highly sensitive ground fault responsive means. The means includes a differential transformer with a toroidal core fabricated of a magnetic material. Phase and neutral conductors pass through an opening in the toroidal core, forming single turn primary windings. The differential transformer also includes a secondary winding comprising a plurality of turns wound on the toroidal core. This secondary winding is connected to a solenoid assembly comprising an armature, an operating coil and a frame mounted on a casing. The armature is adapted for movement between an extended position and a retracted position in response to energization of the operating coil. A latch hook is attached to the armature and disposed for engaging the armature member of the actuator assembly. Thus, energization of the operating coil causes the latch hook to draw the armature away from a latch member to initiate tripping of the circuit breaker. In consequence, the solenoid assembly opens the circuit breaker contacts in response to ground fault current on the order of 3 to 5 mA, and therefore is desirable from the standpoint of protecting human life against electrical shock.

Another known GFCI comprises a differential transformer connected to an AC source which produces a voltage output when an imbalance in current flow between the power lines occurs. The voltage output is coupled to a differential amplifier through a coupling capacitor, rectified, current limited and applied to the gate of an SCR. When the SCR conducts, the winding of a transformer connected across the power line is energized, causing two circuit breaker switches to open. A circuit is also provided for closing the switch when the line becomes unbalanced.

Another protection arrangement uses a ground leakage protector including a ground fault release coil controlled by a ground fault detector. The ground fault release coil is normally energized, and is de-energized when a ground fault appears. Upon detection of a ground fault, a restraining latch is disabled resulting in the opening of the circuit breaker.

Yet another protection arrangement uses a unitary circuit breaker of the molded case type including within its casing means sensitive to ground faults, means sensitive to overcurrents, and means sensitive to short circuit currents. All of the aforementioned means act on a common trip latch of the breaker to cause automatic opening when overcurrent is sensed. Also included is a current imbalance detecting foil which energizes a tripping solenoid to release a normally latched plunger to cause tripping. Similarly, a ground fault protection system is known which employs a dormant oscillator which is triggered into oscillation to initiate disconnection of the protected distribution circuit upon occurrence and detection of a neutral to ground type of fault.

While numerous techniques are available for protecting against ground faults, a key concern in the application of GFCIs in residential and commercial environments is GFCI reliability. As long as the GFCI is operating properly, protection is provided against ground faults, preventing electrical shock. In addressing problems of reliability, it must be considered that most GFCIs are connected to premise electrical wiring at installation and thereafter forgotten, the homeowner or contractor assuming they will operate correctly one, five or ten years after they are installed. Unfortunately, this is not necessarily so. GFCI devices are subject to a number of failure modes. For example, GFCIs are susceptible to bad power supply, open current sensing coil winding, integrated circuit failure, shorted or open SCR device, open breaker coil, failed contacts, etc. Therefore, there exists a need for a GFCI capable of communicating to a user whether or not the device is functioning properly any time after installation.

One solution is to incorporate a test button on the face of the GFCI device that when pressed simulates a ground fault. This simulated ground fault is treated by the internal circuitry as if a real fault occurred. All internal components and circuitry are thereby exercised and tested. If the internal mechanism of the GFCI is working properly, the contacts open and power is removed from the electrical circuit protected. Following a test, the GFCI must be reset to its normal operating condition. This could be done by pushing a reset button on the face of the GFCI device. Users would be instructed to test their GFCIs periodically and replace failed devices. The problem with this scheme is that in reality most users do not test their GFCIs on a regular basis if at all, even when the face of the GFCI is labeled with the words 'TEST MONTHLY' on its face. Thus, there is a real need for a GFCI device that incorporates the ability to automatically test itself periodically without any user intervention, in addition to reminding the user to periodically test the GFCI manually.

One factor that lowers GFCI reliability, in addition to a user's failing to test the GFCI, is a power outage and the corresponding surge when power is restored. Therefore it would be beneficial for the GFCI to detect power being restored after a sufficiently long power outage and to force the user to subsequently test the device. Power restoration could cause huge spikes of voltage and current to appear on the power line thus creating a possibility of component failure.

Another potential problem arises because GFCIs typically installed prior to the electricity being applied, especially in new construction. Consequently, there is a real possibility that an installer might inadvertently connect the line side of the AC wiring to the load side of the GFCI. While downstream electrical devices are protected, any receptacles built into the GFCI device itself would not be protected, creating a potential hazard. The GFCI then would remain wired incorrectly unless the device was able to detect a miswiring condition. The ability to detect whether line and load sides were reverse wired would increase the safety level of the device. At the time power is initially applied, the GFCI would alert the user by way of a visual and/or audible alarm, in the event a miswiring condition was detected. The visual and/or audible alarm could not be eliminated until the miswiring condition was removed decreasing the probability of incorrect wiring.

OBJECTS AND SUMMARY OF THE INVENTION

It is therefore an objective of the present invention to provide an intelligent ground fault circuit interrupter (IGFCI) device that can automatically test its internal circuitry on a periodic basis, thereby boosting its own probability of proper operation in the event of a real ground fault. Such a GFCI could test itself on a monthly, weekly, daily or even hourly basis. In particular, all key components could be tested except for the relay contacts. This is because tripping the contacts for testing would have the undesirable result of removing power to the user's circuit. However, once a month, for example, the GFCI device could generate a visual and/or audible signal or alarm reminding the user to manually test the GFCI. The user would, in response to the signal, initiate a test by pushing a test button, thereby testing the operation of the contacts in addition to the rest of the GFCI circuitry. Following a successful test, the user would reset the GFCI device by pushing a reset button.

Another object of the present invention to provide an intelligent ground fault circuit interrupter (IGFCI) system which delivers increased reliability of operation over conventional GFCIs. The IGFCI incorporates BIT circuitry and partial redundancy in an effort to deliver such increased reliability. The BIT circuitry automatically tests internal GFCI components except relay contacts on a periodic basis, such as once an hour. If a failure is detected, a visual and/or audible alarm is generated. The relays are opened immediately in consequence using built in redundant relay trip means.

Another object of the invention is to provide an IGFCI with the ability to detect when the GFCI is incorrectly wired in an electrical wiring system, e.g., when load and line connections have been reversed. Upon detection of a miswiring condition, a visual and/or audible alarm is triggered to alert the user that the device is in an incorrectly wired state, and the relay contacts are opened removing AC power from downstream electrical devices. The GFCI can not be reset unless the miswiring condition is removed.

Another object of the present invention is to provide an IGFCI with the ability to monitor the steady or slowly rising ground leakage current present on the AC power line and adjust the trip threshold of the internal GFCI circuit accordingly up or down, preventing nuisance tripping of the GFCI. The trip threshold of the GFCI would track slowly rising and falling ground leakage currents caused by certain appliances. However, 5 ma of fast rising leakage current would immediately cause the GFCI circuit to trip the relay and open the contacts.

Yet another object of the present invention is to provide a periodic test reminder signal to alert a user to manually test the IGFCI device. A visual and/or audible alert signal would be generated 30 days after power was initially applied or 30 days after the last manual test was performed. A daylight detector would preferably be included to silence the test reminder signal during the evening and nighttime hours while most people are asleep.

The present invention provides an intelligent circuit interrupt system for electrical connection between an AC source and a load for interrupting a flow of AC between the source and load upon detection of an interrupt condition. The system includes a circuit interrupter electrically connected to phase and neutral terminals of the AC source for cutting off the AC at the source at detection of the interrupt condition. The circuit interrupter acts in conjunction with a relay switch which includes a relay coil and phase and neutral contacts. Phase and load ends of the phase contact are electrically connected, respectively, to a load side phase port of the interrupt means and a load phase terminal. Phase and load ends of the neutral contact are electrically connected, respectively, to a load side neutral port of the interrupt means and a load neutral terminal. The relay coil controls the state of the contacts (i.e., high or low impedance state) in response to an interrupt signal generated in the interrupter.

The system includes an open-contact miswiring detector (OCMD) electrically connected to one of the phase and neutral contacts for detecting a miswiring condition when the contacts are in an open state, and a closed-contact miswiring detector (CCMD) electrically connected to the OCMD and to one of the neutral and phase contacts for detecting a miswiring condition when the contacts are in a closed state. The system also includes a timing signal generator for generating system timing signals, a test circuit electrically coupled to the interrupt means and the timing signal generator for testing interrupt means' operability and generating a signal therefrom, an alarm circuit electrically responsive to the test circuit, the timing signal generator, the OCMD and the CCMD for communicating an open-contact miswiring condition, a closed-contact miswiring condition, an operational failure condition, and a need for external testing condition, and a power supply electrically connected between the load ends of the phase and neutral contacts, and to the timing signal generator.

Preferably, the various objects and features of the invention will be apparent from the following description in which the preferred embodiments are set forth in detail in conjunction with the accompanying drawings.

DETAILED DESCRIPTION OF THE INVENTION

Figure 1:
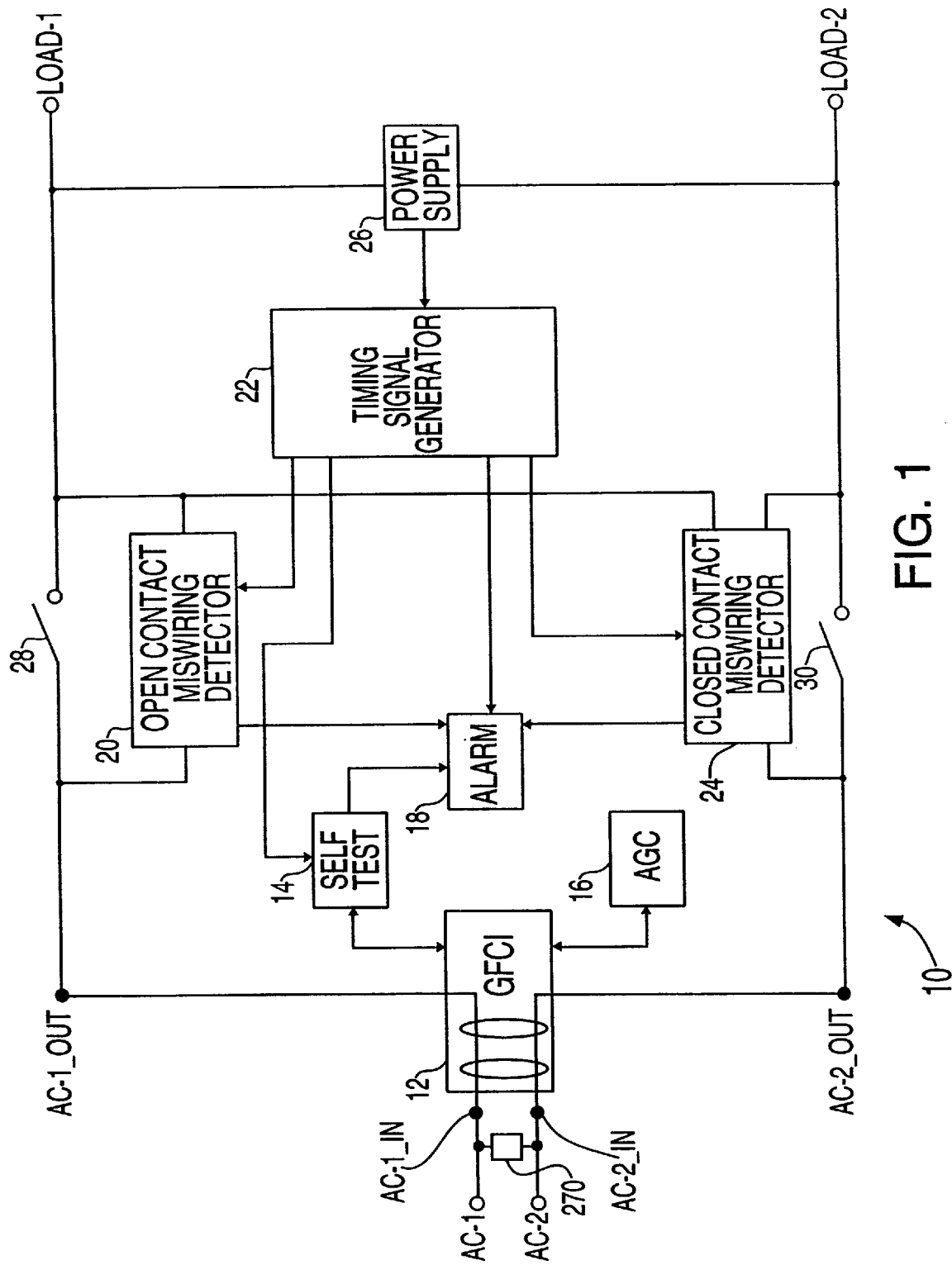
FIG. 1 is a functional block diagram of a preferred embodiment of the present invention.

A preferred embodiment of an Intelligent Ground Fault Circuit Interrupter (IGFCI) System 10 (hereinafter referred to interchangeably as "IGFCI", "system" and "device") of the present invention will now be described in accordance with FIG. 1. The IGFCI 10 shown therein preferably includes a standard Ground Fault Circuit Interrupter (GFCI) 12 as its "core" structure, readily known to those skilled in the art, a self test circuit 14, open-contact and closed-contact miswiring detectors 20, 24, an alarm circuit 18 and an automatic gain control circuit 16. Installed properly, the system 10 protects all downstream electrical devices connected to it as well as any receptacles present in the device itself. It should be noted, however, that the description of the preferred embodiment is presented merely for illustration purposes only and is not meant to limit the scope or spirit of this invention.

FIG. 1 shows the IGFCI 10 as a four terminal device which includes power input terminals AC-1 and AC-2, referred to hereinafter as phase and neutral line terminals, and system output terminals LOAD-1 and LOAD-2, referred to hereinafter as phase and neutral load terminals. An AC power source (not shown in the figure) is connectable to the device 10 to provide AC power therein via phase and neutral line terminals AC-1 and AC-2. A metal oxide varistor (MOV) 270 is shown electrically connected between phase and neutral line terminals for suppressing voltage spikes. The GFCI 12 is disposed in a current path for alternating current flow from the AC source to the load. The GFCI includes line (AC-1_IN, AC-2_IN) and load side (AC-1_OUT, AC-2_OUT) phase and neutral ports, wherein AC-1_IN and AC-2_IN electrically connect the GFCI to phase and neutral line terminals of the AC source. The GFCI is also electrically connected to a self-test circuit 14, a first contact 28 of a relay switch 31 at terminal AC-1_OUT and to a second relay contact 30 of switch 31 at neutral line terminal AC-2_OUT.

Also connected to the line side of relay contact 28 is a phase port of the open-contact miswiring detector (OCMD) 20, a load port of which is electrically connected to the load side of relay contact 28, phase load terminal LOAD-1 of the IGFCI and a phase port of the CCMD. The closed-contact miswiring detector (CCMD) 24 is electrically connected at a line side phase port to both GFCI load side neutral terminal AC-2_IN and to a line side of relay contact 30, and at a load side neutral port to both a load side of relay contact 30 and IGFCI load side neutral terminal LOAD-2.

The IGFCI 10 also includes a power supply 26 which provides DC for the IGFCI from the AC source. A phase port of power supply 26 is electrically connected to phase load terminal LOAD-1 and the load side of relay contact 28. A neutral port of the power supply is electrically connected to neutral load terminal LOAD-2, and the load side of relay contact 30. The power supply generates and supplies DC to the system (i.e., Vcc and Vcc/2, which are not shown in the system diagram of FIG. 1). A frequency calibration signal port is electrically connected to an input port of a timing signal generator 22. Timing signal generator 22 is electrically connected to timing ports of open and closed miswiring contact detectors 20, 24, to self test circuit 14 and to alarm circuit 18, respectively. Alarm circuit 18 is also electrically connected to selftest circuit 14, open-contact miswiring detector 20 and closed-contact miswiring detector 24.

One of the key features of the IGFCI 10 is the device's ability to detect improper installation, i.e., miswiring, to an electrical wiring system in which it is installed. The most common cause of miswiring occurs when the AC power source is connected to the LOAD-1, LOAD-2 terminals and the load is connected to the AC-1, AC-2 terminals. The present invention anticipates such miswirings whether the contacts are open or closed. More particularly, the open-contact miswiring detector 20 detects a miswiring condition when relay contacts 28, 30 are in an open state; and the closed-contact miswiring detector 24 detects miswiring when the relay contacts are in a closed state.

Relay contacts 28, 30 pass AC to the load if the GFCI 12 maintains the contacts in a closed state. Automatic Gain Control circuit (AGC) 16 continually adjusts the sensitivity of the GFCI to track or compensate for ground leakage current typically generated by loads attached to the system, i.e., appliances such as refrigerators, dishwashers, washing machines, etc. The ground leakage current in many such appliances can cause nuisance tripping of GFCIs if the appliances are located on a shared branch circuit, such as the GFCI, due to the design of electrical circuitry contained therein. Accordingly, the IGFCI, through the automatic gain control current, recognizes and adjusts for this type of leakage current. The self test circuit 14 interfaces with portions of the GFCI core circuitry to provide for unaided, unattended self testing of the entire GFCI circuit including its SCR and trip coil.

Power supply 26 generates the DC electrical voltages needed by the internal circuitry of the device 10 via DC connections identified in FIGS. 2–8, 9A and 9B, and includes phase, neutral and frequency calibration (i.e., 60 HZ, to be discussed in greater detail below) ports. The device 10 utilizes voltages of 12 and 6 volts, i.e., Vcc and ½ Vcc, respectively. Timing signal generator 22 generates the signals which ultimately alert the user of a need to test the device 10, as well as triggering periodic internal self tests. The alarm circuit 18 is meant to indicate an alarm state to a user, for example, an audible signal to communicate various alerts to a user such as when a miswiring situation exists. In the preferred embodiment, the alarm circuit includes a ceramic piezo element as the sound producing component that actually generates the alarm sound. As an alternative, sound may be produced by a speaker, buzzer or other sound generating element known to those skilled in the art. Alternatively, it is envisioned that the alarm circuit generates a flag signal which may be transmitted to a sensor linked to a digital computer, which acts accordingly.

The circuits which define the embodiment of the present invention shown in FIG. 1 and briefly described above will now be explained in greater detail with reference to FIGS. 2–8, 9A and 9B. In the figures, like numerals will define like terms.

Figure 2:
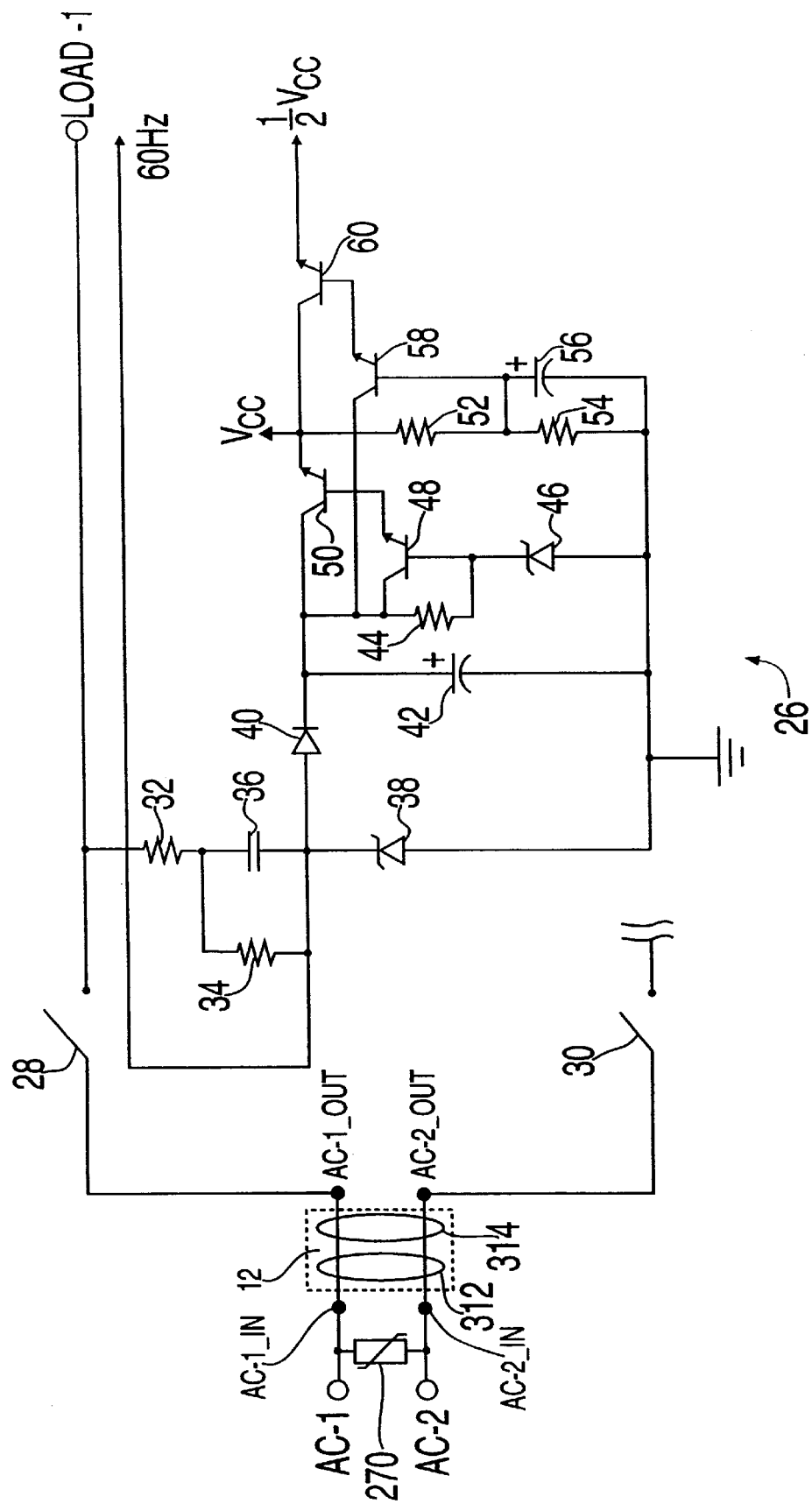
FIG. 2 is a detailed schematic diagram of a power supply circuit which may be utilized within the embodiment of FIG. 1.

FIG. 2 is a detailed schematic diagram of one embodiment of power supply 26, previously identified in FIG. 1. Power supply 26 is shown electrically connected at its phase port to the load side of relay contact 28 and terminal LOAD-1; the frequency calibration port outputs a zero crossing, or clock, signal "60 HZ" which is generated therein to synchronize system or device 10 operation. The power supply rectifies AC supplied through the GFCI 12 across contact 28 while operational, thereby providing a ½ Vcc signal and a Vcc signal to the rest of the system. The power supply is preferably a CMOS device in order to minimize total power dissipation for the device 10 averages between 10 to 20 milliwatts.

A preferred form of the power supply circuit is as follows. A resistor 32, having a nominal value of between 10 and 20 ohms, is electrically connected at a first end to the load end side of relay contact 28 and at a second end to both a first end of a capacitor 36 and a first end of a resistor 34. Second ends of resistor 34 and capacitor 36 are electrically connected to the timing signal generator 22, as mentioned above, to a cathode end of a zener diode 38 and to an anode end of a diode 40. Capacitor 36 serves as a series impedance to reduce the AC line voltage at the load end side of contact 28 when the power requirement on the supply is relatively low; capacitor 36 also aids in power factor correction. By defining capacitor 36 with a 1 $\mu$F value, an equivalent impedance of approximately 2.6 K$\Omega$ is generated at 60 Hz. Resistor 34, in parallel with capacitor 36, is designed with a high value (around 100 K ohms) to limit the current through the zener diode 38. Zener diode 38 displays a breakdown value of approximately 15 V in order to pre-regulate the incoming AC voltage. The zener diode 38 also defines the origin of the zero crossing signal, 60 HZ, the clock input to timing signal generator 22.

Cathode end of diode 40 is electrically connected to an anode end of a storage capacitor 42, a first end of a current-limiting resistor 44, and collectors of NPN transistors 50, 48, 58. Diode 40 provides half-wave rectification for storage capacitor 42, which supplies current to zener diode 46 and prevents the discharge of storage capacitor 42 during the negative half cycle of the AC source. A second end of resistor 44 is electrically connected to both a base of transistor 48 and a cathode end of a second zener diode 46. Resistor 44 supplies current from storage capacitor 42 for zener diode 46, which displays a breakdown voltage of 13 V to maintain a constant voltage at NPN transistors 48, 50. Anode ends of zener diodes 38, 46 and cathode end of storage capacitor 42 are electrically connected to ground.

An emitter of transistor 48 is connected to a base of transistor 50, and an emitter of transistor 50 is connected to a collector of an NPN transistor 60 (defining Vcc). An emitter of transistor 58 is electrically connected to a base of transistor 60, an emitter of which provides ½ Vcc. A collector of transistor 60 is electrically connected to a first end of a resistor 54, a first end of a storage capacitor 56 and a base of transistor 58. Cathode end of storage capacitor 56 and second end of resistor 54 are electrically connected to ground. Storage capacitor 56 helps to maintain the base of transistor 59 at a constant voltage in the event transients appear on Vcc. Resistors 52, 54, are defined to be approximately 100 K$\Omega$ to form a voltage divider whose output is approximately one half the Vcc voltage for regulating the NPN transistor pair 58, 60. Consequently, a constant voltage of approximately ½ Vcc is supplied from the emitter of transistor 60. The reduced ½ Vcc voltage serves as a reference voltage for some of the voltage comparators used in the circuitry of device 10. Because power supply 26 is connected to the AC source on the load side of relay contacts 28, 30 no power is provided to the system if the relay contacts 28, 30 trip for any reason.

Figure 3:
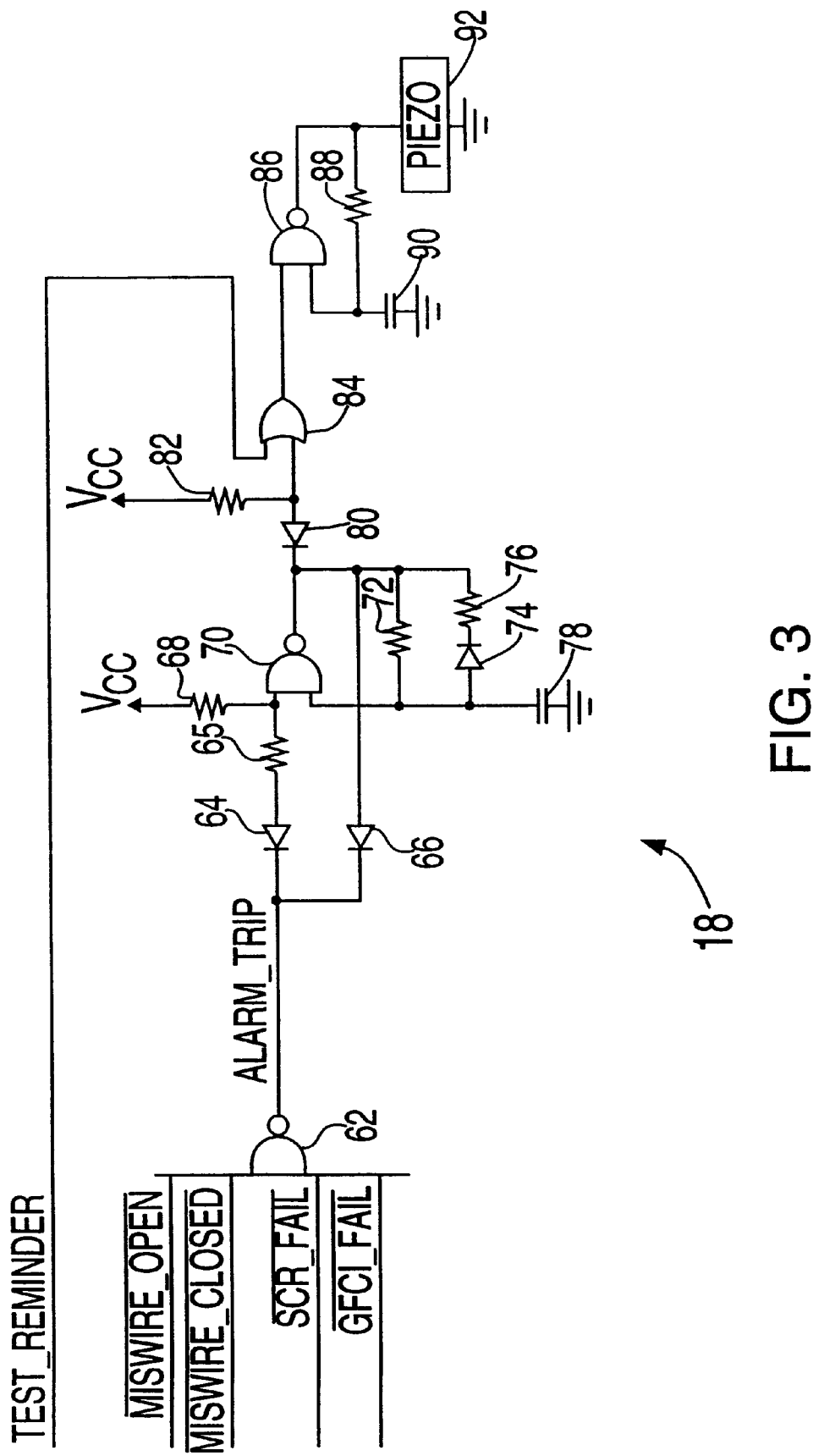
FIG. 3 is a detailed schematic diagram of an audible alarm circuit which may be utilized within the embodiment of FIG. 1.

FIG. 3 is a detailed schematic diagram of one embodiment of an alarm circuit 18, previously identified in FIG. 1. The alarm circuit 18 receives several inputs from circuits which have yet to be described in detail, for example, a MISWIRE_OPEN bar signal is supplied from open-contact miswiring detector 20 (FIG. 5), a MISWIRE_CLOSED bar signal from closed-contact miswiring detector 24 (FIG. 6), and a pair of SCR_FAIL bar and GFCI_FAIL bar signals from self-test circuit 14 (FIGS. 9A, 9B), all of which are supplied to a Nand circuit 62. The 'bar' designation after any signal name signifies that the signal is active low. The logical output of Nand circuit 62 provides an ALARM_TRIP signal to cathode ends of diodes 64 and 66. An anode end of diode 64 is electrically connected to a first end of a resistor 65 to generate an input signal to a Nand circuit 70. Vcc is also connected to the second end of resistor 65 and logical Nand circuit 70. The logical output of Nand circuit 70 is provided to a cathode end of a diode 80, an anode end of diode 66, and to first ends of resistors 72 and 76. Second end of resistor 76 is electrically connected to a cathode end of diode 74, the anode end of which is electrically connected to a first end of a discharge capacitor 78, a second end of resistor 72 and a second input to Nand circuit 70.

An anode end of diode 80 is electrically connected to Vcc through a resistor 82 and to an input of a logical Or circuit 84. A second input to Or circuit 84 receives a TEST_REMINDER signal from the timing signal generator 22 (to be described below with reference to FIG. 4); the Or circuit logical output is electrically connected to a logical Nand circuit 86. A second input to Nand circuit 86 is electrically connected to the circuit's logical output through a resistor 88. The magnitude of the output (feedback) signal is held on a first end of a capacitor 90, the second end of which is grounded. The logical output of Nand circuit 86 is also electrically connected to an input to PIEZO element 92, an output of which is connected to ground, to generate an alarm. The PIEZO element is just one example of alarm or sound generation circuitry 18 which may be utilized in the system to produce various duration beeping or alarm sounds to communicate when the system 10 is in certain states, or at the occurrence of various events. For example, the alarm or beeping would signal a user in the event a miswiring condition were detected.

The actual frequency of the sound emitted by the circuit 18 is determined by the values of resistor 88 and capacitor 90, which are coupled to gate 86 in a classic oscillator configuration. The charge and discharge of capacitor 90 causes the Nand circuit 86 logical output to swing back and forth or oscillate with a duty cycle of approximately 50% because capacitor 90 is charged and discharged through the same resistor 88. If, however, the output of Or circuit 84 goes low, oscillations cease because the output of Nand circuit 86 remains high no matter what appears across capacitor 90. Preferably, resistor 88 and capacitor 90 define an RC time constant which rings sound producing component 92 at between 2.5 to 3.0 KHz. As long as the output of OR gate (circuit) 84 is high, the oscillator causes the resonator 92 to generate a tone.

Nand circuit 70, resistors 72, 76, diode 74 and capacitor 78 determine the duty cycle (i.e., the turn on and turn off times) of the oscillator built around Nand circuit 86 to drive PIEZO element 92. The duty cycle of the tone, however, is not symmetrical because resistors 72, 76 have different values, the parallel combination of which determines the off duration of the tone. Due to the blocking effect of diode 74, resistor 72 alone determines the on duration of the tone. Resistors 72, 76 are preferably chosen to produce an approximately 150 millisecond tone-on and one second tone-off periods. Tone is produced when the ALARM_TRIP signal is high (i.e., diodes 64, 66. are reverse biased). This allows the output of logical Nand circuit 70 to oscillate due to the charge and discharge of capacitor 78, similar to the action of capacitor 90 as discussed above.

The alarm signals input at logical Nand circuit 62 are generated by the system 10 when either a miswiring condition or a GFCI related failure is detected. A low, therefore, at any of these inputs causes the alarm circuitry 18 to output an audio or visual alarm to alert a user that a miswiring condition or failure has occurred. Conversely, keeping the tone or alarm indicia off, the non-feedback inputs to logical Nand circuits 70, 86 are held in the low state by the ALARM_TRIP signal, causing the logical signals output therefrom to remain in the high state which prevents oscillation. A low output from Nand circuit 62 is provided through diodes 64, 66 compelling the outputs of Nand circuits 70, 86 to remain in the high state. Logical Or circuit 84 enables the oscillator driving the PIEZO element 92 with the TEST_REMINDER signal generated within the timing signal generator 22. This TEST_REMINDER signal functions to remind a user to periodically manually test the device 10. When the TEST_REMINDER signal is high, the resonator 92 will produce a short alarm tone (or short infrared of visible light output) once per minute.

Figure 4:
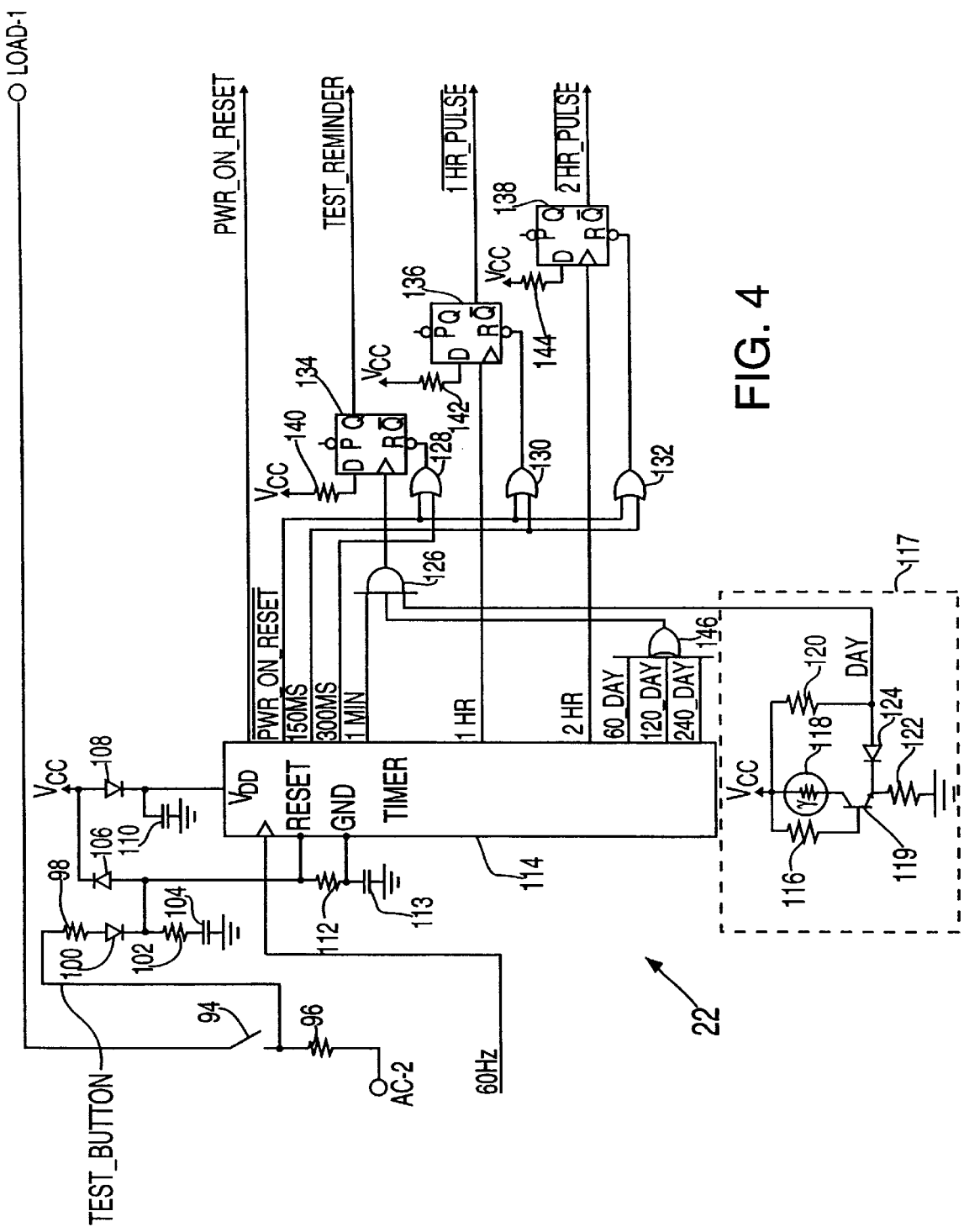
FIG. 4 is a detailed schematic diagram of a timing signal generator which may be utilized within the embodiment of FIG. 1.

FIG. 4 is a detailed circuit diagram of one embodiment of a timing signal generator 22 described above in relation to FIG. 1. The combination timing signal generator and alarm circuit 18 contained within the present invention was developed in part because it was found that user instructions (accompanying conventional GFCIs) for periodically testing the system or device at least once per month are typically ignored by the user. Further, most users are found to ignore the clear notices placed not only within the unit's installation instructions but even those on the face of the device itself. The timing signal generator attempts to compensate for this reality by causing to be generated a short chirping sound once every minute to remind a user to test the device once a test reminder signal is enabled (preferably every 30 days).

The timing signal generator 22 also generates test pulses used by built in test circuitry (self-test circuit 14 identified as FIGS. 9A, 9B, to be discussed in detail below) to precipitate automatic self-testing once every hour, and the power on reset signal (PWR_ON_RESET) which is used by the system 10 to put various components in a known state when system power is initialized. At the core of the signal generator 22 is a timer circuit 114, which may embody any monolithic integrated circuit, group of MSI or LSI logic functions, ROM based sequencer or other clock driven circuit known to those skilled in the art that is capable of counting. Upon application of system power, the timer 114 generates PWR_ON_RESET and PWR_ON_RESET bar signals, which are active immediately after power is applied and are active for at least 100 msec. The 60 HZ signal provided by the power supply 26 (zero crossing signal generated across the zener diode 38) drives the timer. All the signals generated by the timer 114 are derived ultimately from this clock input.

As mentioned above, 30 days after AC power is initially applied, the IGFCI device 10 emits an active high test reminder signal, TEST_REMINDER, to alert a user of a need to manually test the device 10. To do so, the user presses a momentary switch button 94 (not shown in FIG. 1) located on the face of the device 10, one end of which is connected to the LOAD-1 terminal. An opposite end of switch 94 is electrically connected to a first end of a resistor 96, a second end of which is connected to terminal AC-2. The first end of resistor 96 is also electrically connected to a first end of a resistor 98, a second end of which is connected to an anode end of a diode 100. A cathode end of diode 100 is electrically connected to a first end of a resistor 102, an anode end of a diode 106, a reset input to timer 114, and a first end of a resistor 112. A second end of resistor 112 is electrically connected to a first end of a capacitor 113, a second end of which is connected to ground, and also as a GND input to timer 114. Cathode end of diode 106 is electrically connected to Vcc and an anode end of a diode 108. A cathode end of diode 108 is electrically connected to a first end of a capacitor 110, a second end of which is connected to ground, and as a Vdd input to timer 114.

In addition to the POWER_ON_RESET, POWER_ON_RESET bar signals mentioned above, the timer also generates 150MS, 300MS, 1MIN, 1HR, 2HR, 60_DAY, 120_DAY and 240_DAY signals. Signals 60_DAY, 120_DAY and 240_DAY are provided as inputs to a logical Or circuit 146, an output of which is provided to a logical Nand circuit 126 along with the 1MIN and DAY signals generated by a DAY signal generator circuit 117. Within the DAY signal generator circuit 117, a first end of a resistor 120 is electrically connected to an anode end of a diode 124. Second end of resistor 120 is electrically connected to first ends of a resistor 116, and a photoresistor 118, which are electrically connected in parallel to Vcc. Second ends of resistors 116 and 118 are electrically connected to a base and emitter of an NPN transistor 119, respectively. An emitter of the NPN transistor 119 is electrically connected to a first end of a resistor 122, a second end of which is grounded, and to a cathode end of a diode 124. The PWR_ON_RESET bar is provided to each of three logical Or circuits 128, 130 and 132. 150MS is provided to logical Or circuits 130 and 132, and 300MS is provided to logical Or circuit 128. The output of logical Or circuit 128 is provided as an active-low reset to a D-type latch circuit 134. An output from logical Nand circuit 126 is provided as a clock input to the latch circuit; Vcc holds the circuit's "D" input high through a resistor 140. Also included are "D" type latch circuits 136 and 138, which are electrically connected via pull-up resistors 142 and 144 to Vcc. The 1HR and 2HR signals are electrically connected as clock inputs to the f/f circuits 136 and 138, respectively from the timer 114. Signals output from logical Or circuits 130 and 132 are electrically connected to the latch circuits 136, 138 as active low reset inputs. Finally, TEST_REMINDER, 1HR_PULSE bar and 2HR_PULSE bar signals are the logical outputs emanating from the "Q", "Q bar" and "Q bar" outputs of latch circuits 134, 136 and 138, respectively.

Actuation of momentary switch 94 simulates a ground fault by momentarily causing the current flowing into the device via terminals AC-1 and AC-2 to differ. If working properly, the GFCI circuit 12 (FIG. 7) detects the current-flow difference via magnetic cores 312, 314, and generates an SCR control signal thereby. As a result, the SCR 244 within the GFCI is triggered, the relay trip coil 260 is energized and the relay contacts 28, 30 of the IGFCI are exercised. Pressing the test button 94 also causes the timer 114 to reset by resetting its internal counters and beginning again a count of a 30 day period. The timer's reset input, which is active high, is coupled to the TEST_BUTTON signal through resistor 98 and diode 100. Resistor 102 and capacitor 104 provide filtering for the reset input signal.

The "D" latch circuit 134, therefore, operates as a one-shot and generates a 150 ms long high pulse once every minute, i.e., the TEST_REMINDER signal. Since its input is pulled high through resistor 140 to Vcc on each rising edge of its clock input, a logical high is clocked in to the latch circuit and appears at the circuit's "Q" output. The output of logical Nand circuit 126 goes high when all its inputs are high. Approximately 30 days after power is initially applied to the device 10, the 60_DAY signal goes high causing the output of logical OR circuit 146 to go high. If the DAY signal and the 1MIN signals also go high, latch circuit 134 gets clocked and a logical high appears at the circuit's "Q" output. Approximately 150 ms later, the 300MS signal from timer 114 goes low and resets the latch circuit 134 "Q" output to a logical low. The 300MS signal is gated with the PWR_ON_RESET bar signal to allow either signal to reset the latch circuit 134. This reset signal can also reset latch circuits 136, 138 through logical Or circuits 130, 132 respectively.

The DAY signal output from circuit 117 is driven high when the intensity of the light surrounding the IGFCI device 10 sufficiently lowers the resistance of photoresistor 118. Consequently, increased current flows through the emitter of transistor 119 and resistor 122, reverse biasing diode 124 and the voltage level of the DAY signal to be pulled up to Vcc. When there is insufficient light intensity (i.e., at night), the resistance of photoresistor 118 is very high which limits current flow through resistor 122 to reverse bias diode 124. Resistor 122 then sinks current to ground keeping the output of Nand circuit 126 a logical low. This prevents the TEST_REMINDER signal from sounding during the evening and night hours, the time most people are asleep. If the user fails to heed the once a minute TEST_REMINDER signal, commenced after 30 days, the signal will remain active for approximately another 210 days after which the timer 114 resets itself. If at any time during the 210 days the user manually tests the device 10, the timer 114 resets and begins again counting the 30 day period again. The 120_DAY, 240_DAY clock signals are ORed with the 60_DAY in logical Or circuit 146 to form one of the three inputs to logical Or circuit 126, each of which may cause a change of state in the latch circuit 134 output, i.e., the TEST_REMINDER signal.

Another key feature of the IGFCI system 10 is its ability to detect a miswiring condition when the system is wired with the contacts of contact relays 28, 30 in either an open or closed state. This is very important because it is impossible to predict what state the relay contacts will be in when AC power is first applied. Open-contact miswiring detector 20 detects and memorizes, using latch circuit 174, whether the AC power is wired correctly to the AC-1, AC-2 terminals, or incorrectly to the LOAD-1, LOAD-2 terminals. This detection takes place at a point in time shortly after power is initially applied. If the device 10 is installed with the relay switches 28, 30 already in the closed position, which is a real possibility, the detection circuitry 20 defaults, in which case a determination of proper or improper wiring must be made by the closed-contact miswiring detector 24.

Figure 5:
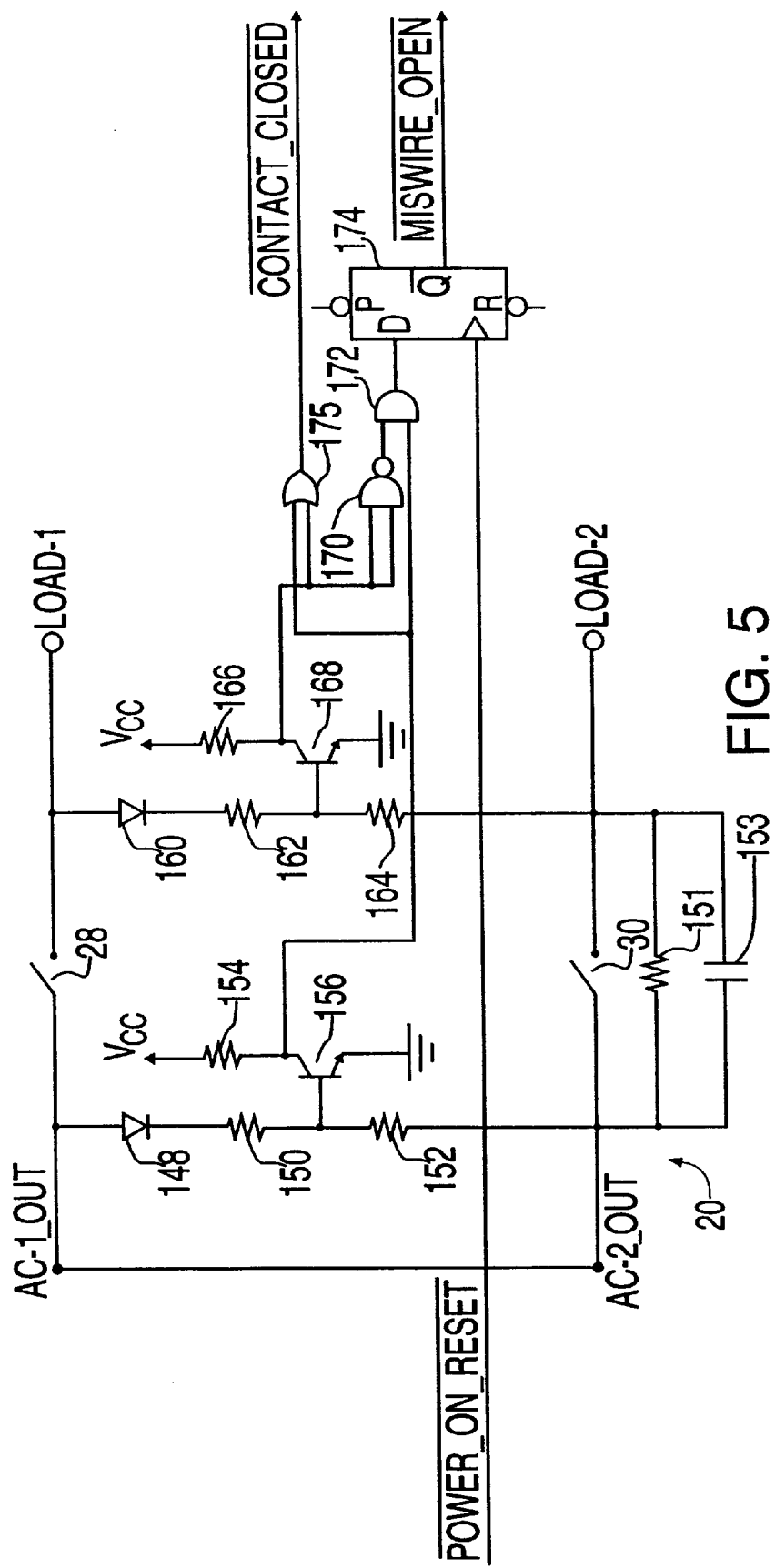
FIG. 5 is a detailed schematic diagram of an open-contact miswiring detector which may be utilized within the embodiment of FIG. 1.

A detailed circuit diagram a preferred form of an open-contact miswiring detector 20 will now be described with reference to FIG. 5. AC-1_IN terminal is shown in the figure electrically connected to an anode end of diode 148 and line side end of contact 28; the load side end of contact 28 is electrically connected to both the LOAD_1 terminal and an anode end of a diode 160. Cathode ends of diodes 148, 160 are electrically connected to first ends of resistors 150, and 162, respectively. Second ends of resistors 150 and 162 are connected to first ends of resistors 152, 164, respectively, and also to a base of NPN transistors 156 and 168, respectively. Emitters of transistors 156, 162 are grounded and collectors are connected through resistors 154, 166, respectively, to Vcc. A second end of resistor 152 is connected to terminal AC-2_OUT, the line side end of contact 30, a first end of a resistor 151 and a first end of a capacitor 153. Accordingly, resistor combination 150, 152 acts as a voltage divider to bias the base of transistor 156.

The collector of transistor 156 also is electrically connected to both a logical Or circuit 175 and a logical And circuit 172. A second end of resistor 164 is electrically connected to load side end of relay contact 30, a second end of resistor 151 and a second end of capacitor 153. Resistor combination 162, 164 together form a voltage divider which defines the base input to transistor 168. The collector of transistor 168 also is electrically connected to Or circuit 175 and as dual inputs to a logical Nand circuit 170. An output of Nand circuit 170 is provided as a logical input to And circuit 172. An output of And circuit 172 is provided as a "D" input to a latch circuit 174.

The functioning of detector circuit 20 is dependent upon NPN transistors 156, 168, which are arranged to detect AC power between the AC line side and LOAD terminals. If an AC power source is correctly wired to the terminals AC-1, AC-2, and, if the contacts of relays 28, 30 are in the open position, AC power is applied only across diode 148. The LOAD side of the relays 28, 30 are left without AC power. Collector current flows through resistor 154 from Vcc to ground and a logic low is applied to the input of logical And circuit 172. Accordingly, the input to latch circuit 174 is a logical low regardless of the state of transistor 168 as long as AC power is applied across terminals AC-1, AC-2. Timing signal generator 22 (FIG. 4) supplies the PWR__ON__RESET bar signal as a clock input to latch circuit 174, the leading edge of which clocks the "low" input out as a "Q bar" signal defining a MISWIRE__OPEN bar signal in a high state (i.e., no miswiring condition). Therefore, if power is applied with the contacts 28, 30 open, the output signal from the detection circuitry 20 remains high.

Alternatively, if AC power is wired incorrectly to the LOAD-1, LOAD-2 terminals, and the relay contacts 28, 30 are in the open position, transistor 156 remains off and resistor 154 pulls one input to And circuit 172 logically high upon the application of AC power. Current therefore flows through diode 160 and is divided within a voltage divider formed by resistors 162, 164, turning on transistor 168. In consequence, current flows through resistor 166, grounding the inputs to logical Or circuit 172. The Or circuit logical output goes high which causes the signal output from latch circuit 174, MISWIRE__OPEN, to go low upon the rising edge of the PWR__ON__RESET bar signal. A low MISWIRE__OPEN bar signal triggers the alarm circuitry 18 which alerts the user that a miswiring condition exists. Since timer 114 of timing signal generator 22 is synchronized to the 60 HZ signal, the rising edge of the PWR__ON__RESET bar signal does not occur at a zero crossing but at a point within the AC cycle at which the data operating as logical inputs to Nand and And circuits 170, 172, are reliable.

If AC power is incorrectly wired to the LOAD-1, LOAD-2 terminals, and relay contacts 28, 30 are closed, application of AC power will prevent the open-contact miswiring detector 20 from triggering the alarm. The MISWIRE__OPEN bar output signal therefore remains high. Consequently, deference is made to closed-contact miswiring detector 24 for determining whether the device 10 is wired correctly and logical Or circuit 175 generates a CONTACT__CLOSED bar signal from the collector outputs of transistors 156, 168, which are low only when relay contacts 28, 30 are in the closed state. Closed-contact miswiring detector 24 utilizes the CONTACT__CLOSED bar signal to determine whether the GFCI circuitry 12 is properly wired. If the relay contacts 28, 30 are open, control passes from the closed-contact miswiring detector 24 to the open-contact miswiring detector 20 for the determination whether the device 10 is wired properly.

Figure 6:
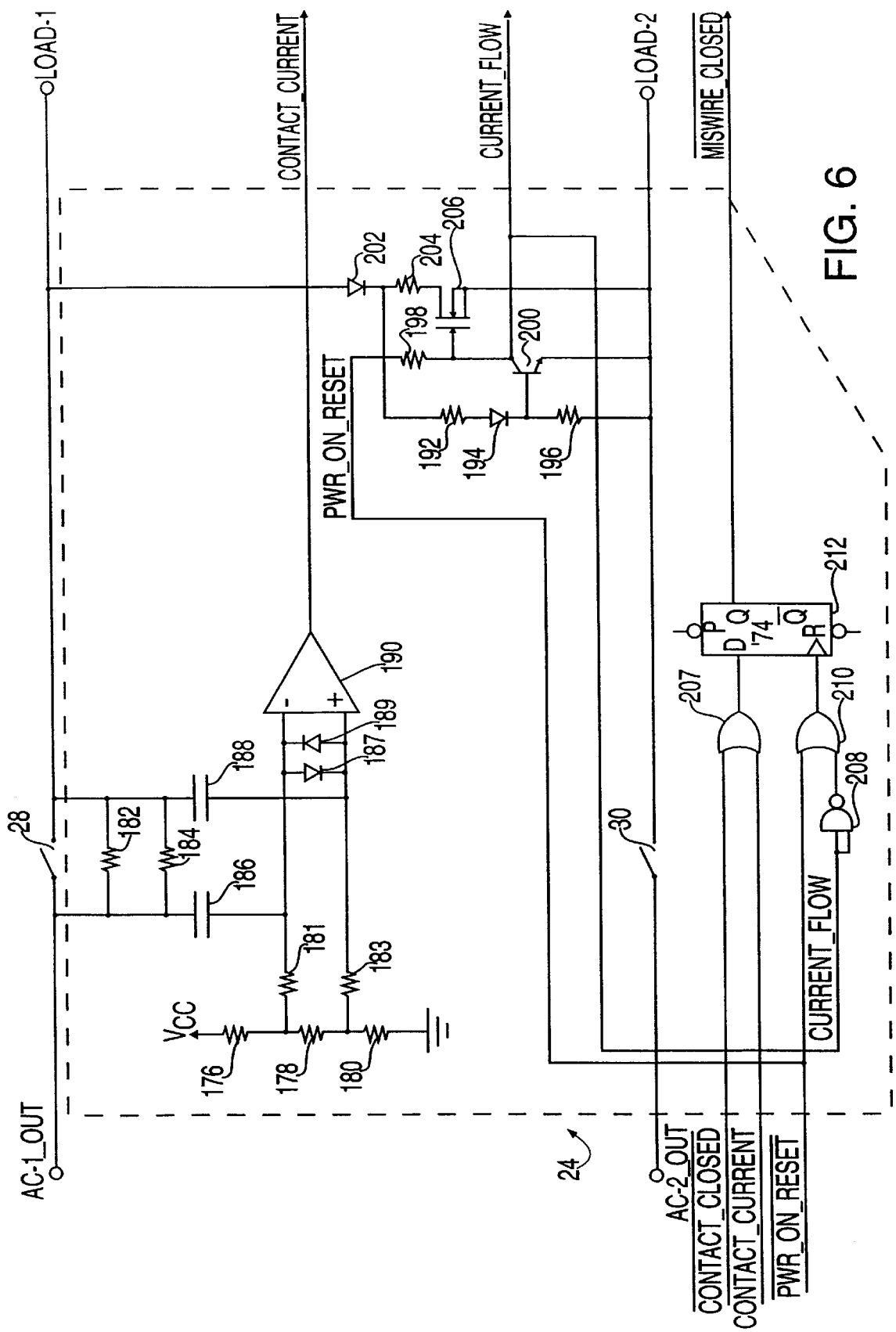
FIG. 6 is a detailed schematic diagram of a closed-contact miswiring detector which may be utilized within the embodiment of FIG. 1.

Referring now to FIG. 6, a preferred form of the closed-contact miswiring detector 24 described above with reference to FIG. 1 will be described. Because mechanical relay contacts 28, 30 exhibit a finite ohmic resistance, a detectable voltage drop is generated across each at power up when the contacts are in their closed state. More particularly, upon system power-up, the system 10 simulates a load which draws 2 to 3 amps on the load end sides of contacts 28, 30 for a time period of approximately 250 $\mu$sec. This burst of current generates a finite voltage drop across the equivalent impedance of the relay contacts 28, 30, which is on the order of 3 m$\Omega$. This voltage drop can be detected and amplified using standard components and will only be generated if the device 10 is wired correctly. If it is improperly wired, no voltage drop will appear across the relay contacts. In the preferred embodiment, the voltage drop across only one of the relay contacts, relay contact 28, is detected. However, either relay contact 28, 30 could be used to detect the presence of the voltage developed across its equivalent "on" impedance.

Line side end of contact 28 is electrically connected to terminal AC-1__OUT of GFCI 12 and first ends of resistors 182, 184, and a capacitor 186. A second end of resistors 182, 184 and a first end of capacitor 188 are electrically connected to the load end side of relay contact 28 and to terminal LOAD-1. Second end of capacitors 186, 188 are electrically connected, respectively, to inverting and non-inverting inputs of op-amp 190. The inverting input to op-amp 190 is also electrically connected to a cathode end of a diode 189, an anode end of a diode 187 and a first end of a resistor 181. The non-inverting input to op-amp 190 also is electrically connected to an anode end of diode 189, a cathode end of diode 187 and a first end of a resistor 183. Second ends of resistors 181, 183 are connected respectively to a first end of resistor 178 and a second end of resistor 176, and, a second end of resistor 178 and a first end of resistor 180. First end of resistor 176 is connected to Vcc and second end of resistor 180 is grounded. An output of op-amp 190, a CONTACT__CURRENT signal, is electrically connected a logical Or circuit 207.

Also electrically connected to terminal LOAD-1 is an anode end of a diode 202; a cathode end of diode 202 is electrically connected to first ends of resistors 204 and 192. Second ends of resistors 204 and 192 are each electrically connected to a drain of FET 206 and an anode end of diode 194. A cathode end of diode 194 is electrically connected to both a first end of a resistor 196, a second end of which is connected to terminal LOAD-2, and a base of an NPN transistor 200. An emitter of transistor 200 also connects to terminal LOAD-2, while its collector (CURRENT__FLOW signal) electrically connects to a gate of FET 206, a first end of a resistor 198, and an input to a Nand circuit 208. The PWR__ON__RESET signal, generated by timer 114 within timing signal generator 22 is provided to a second end of resistor 198 to control the state of the gate of FET 206.

The CONTACT__CLOSED bar signal, generated within the open-contact miswiring detector 20 is input to Or circuit 207 with the CONTACT__CURRENT signal. An output of Or circuit 207 is provided as a "D" input to a latch circuit 212. The CURRENT__FLOW signal is provided into Nand circuit 208, an output of which (CURRENT__FLOW bar), with the PWR__ON__RESET bar signal, are provided as a clock input to the latch circuit 212 via logical Or circuit 210. A "Q" latch circuit output defines a MISWIRE__CLOSED bar signal. Upon device power-up, a positive going PWR__ON__RESET pulse is provided by timer 114 as an Or circuit 210 input, to the collector of transistor 200 and to the gate of n-channel MOSFET 206 through resistor 198 (100 Kohms). The PWR__ON__RESET signal has a minimum duration of at least one complete AC cycle. The time length of the pulse is defined to overlap at least one negative-to-positive-going zero crossing of a power signal generated by the AC power source. MOSFET 206 is used as a voltage controlled switch to control the flow of current from the AC power source through resistor 204. Having a value of approximately 1–2 ohms, resistor 204 allows approximately 2–3 amps to flow through the relay contacts 28, 30 when the AC line voltage reaches approximately 4–5 volts.

Current flow through resistor 204 is restricted to the positive half cycle due to the blocking effect of diode 202.

In addition, MOSFET 206 can only turn on at a negative to positive zero crossing due to the action of transistor 200. Resistors 192, 196 and diodes 202, 194 provide base current during the positive half cycle to effectively clamp the gate of MOSFET 206 to ground, preventing it from turning on. However, sufficient base current is not generated until the AC line voltage reaches approximately 4–5 volts. Thus, current is allowed to flow through resistor 204 until the AC line voltage reaches 4–5 volts, whereupon transistor 200 turns on, grounding the gate of MOSFET 206, effectively turning it off. Current flow through resistor 204 produces a voltage drop of approximately 10 mV across relay contacts 28, 30, for approximately 250 μsec. The gate of MOSFET 206 is the source for the CURRENT_FLOW signal which is inverted before being ORed with the PWR_ON_RESET bar signal by Or circuit 210.

If the device is properly wired to the AC power source while the contacts are closed, voltage comparator 190 detects and amplifies the voltage drop produced across the equivalent ohmic resistance 182 of the relay contact 28. Both sides of relay contact 28 are coupled to the inputs of voltage comparator 190 through 0.01 μF capacitors 186, 188. These capacitors provide isolation between the comparator's 190 reference voltage and circuit ground. The voltage divider, consisting of resistors 176 (10 MΩ), 178 (1 KΩ), 180 (2 MΩ), supplies the reference voltage needed by comparator 190 to determine whether the IGFCI device 10 is correctly wired. Resistors 181, 183 protect the inputs of the comparator 190 when the relay contacts 28, 30 are in the "open" position by limiting the current between the AC power source side and the load side of the relay contacts 28, 30. Back to back diodes 187, 189 limit the voltage potential between the amplifier inputs to a diode drop to protect it against damage due to excessive voltage.

If the device is correctly wired, a positive pulse signal (i.e., a 12 volt signal) appears at the output of comparator 190. This active logical high signal, CONTACT_CURRENT, is clocked into latch circuit 212 after first being gated with the CONTACT_CLOSED bar signal in Or circuit 207. The "Q" output is an active low signal, MISWIRE_CLOSED bar, and is only at a logical low when both relay contacts 28, 30 are in the closed state, otherwise MISWIRE_CLOSED bar is high.

If MISWIRE_CLOSED bar is at a logical high, then the relay contacts 28, 30 are open and the latch circuit input is at a logical high no matter what the logical level of CONTACT_CURRENT signal. This is to assure that the circuit 212 output signal, MISWIRE_CLOSED bar, remains high in the event the relay contacts 28, 30 are in the open state in accordance with open-contact miswiring detector 20 to determine whether a miswiring condition exists. The signal provided by Or circuit 210 remains at a logical high level from the zero crossing until the AC reaches 4–5 volts. At that point, transistor 200 turns on and sinks the signal at the gate of MOSFET 206 to ground, causing CURRENT_FLOW to go low. This signal is inverted by Nand circuit 208, the rising edge of what is used to clock the level of CONTACT_CURRENT to the output of latch circuit 212. The output, MISWIRE_CLOSED bar, is high if no miswiring condition is sensed, and low, if a miswiring condition is sensed.

Figure 7:
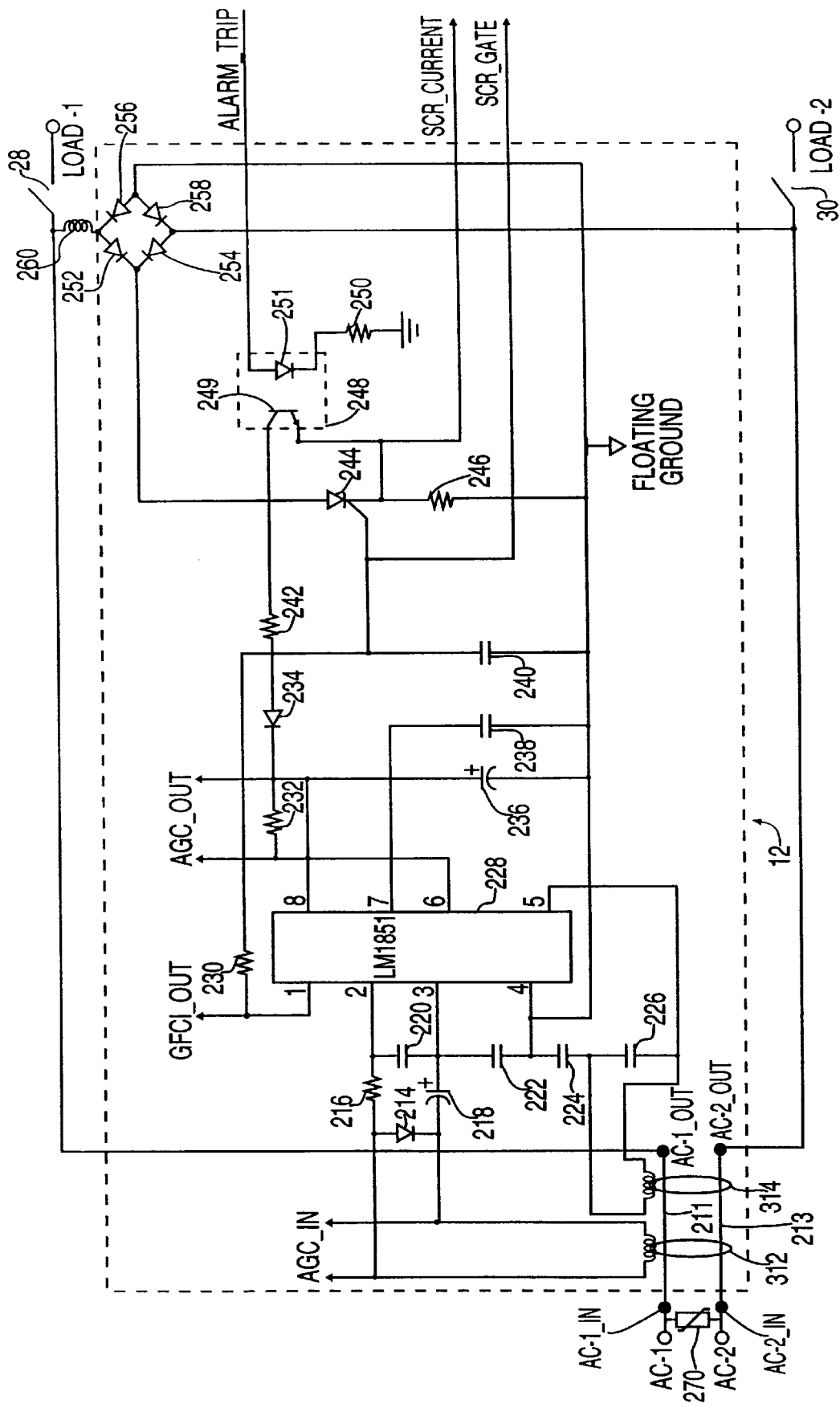
FIG. 7 is a detailed schematic diagram of the ground fault circuit interrupter which may be utilized within the embodiment of FIG. 1.

If the device 10 were incorrectly wired (i.e., the AC power source was connected to the LOAD-1, LOAD-2 terminals), and the relay contacts 28, 30 are closed, the current produced by resistor 204 would not flow through the contacts 28, 30. This is because the current path extends from the LOAD-1 terminal through diode 202, resistor 204, MOSFET 206 to the LOAD-2 terminal. Consequently, no current flows through relay contacts 28, 30, which causes the output of comparator 190 to go low. The CONTACT_CLOSED signal is therefor driven low, since AC appears on both sides of the relay contacts 28, 30. Correspondingly, when latch circuit 212 is clocked, MISWIRE_CLOSED bar goes low, triggering the alarm, alerting the user that the device 10 is incorrectly wired and causing the relay contacts 28, 30 to be tripped by the optocoupler 248 (FIG. 7).

A preferred embodiment of a GFCI circuit 12, described broadly above in relation to FIG. 1, will now be described with reference to FIG. 7. IGFCI terminals AC-1 and AC-2 are electrically connectable to phase and neutral lines of the AC source and to GFCI phase and neutral line terminals AC-1_IN and AC-2_IN. A first or phase conducting element 211 connects terminal AC-1_IN to terminal AC-1_OUT, and a second or neutral conducting element 213 electrically connects terminal AC-2_IN to terminal AC-2_OUT. Terminals AC-1_OUT and AC-2_OUT are also electrically connected to line sides of contacts 28, 30, respectively. Conducting elements 211 and 213 are positioned such that they extend through a pair of magnetic cores 312, 314 which sense AC flowing into and out of the IGFCI device 10.

Terminal AC-1_OUT also is electrically connected to a first end of relay coil 260; a second end of relay coil 260 is electrically connected to an anode end of a. diode 252 and a cathode end of diode 256, which together with diodes 254, 258, form a portion of a diode bridge. Cathode ends of diodes 252, 254 are electrically connected to an anode end of an SCR 244. The cathode end of SCR 244 is connected to a first end of a resistor 246, a second end of which is connected to floating ground, as well as to an emitter gate of a phototransistor 249 of an optoelectronic switch 248. Anode end of SCR 244 also is electrically connected to a first end of a resistor 242 and a collector of phototransistor 249 of switch 248.

Figure 8:
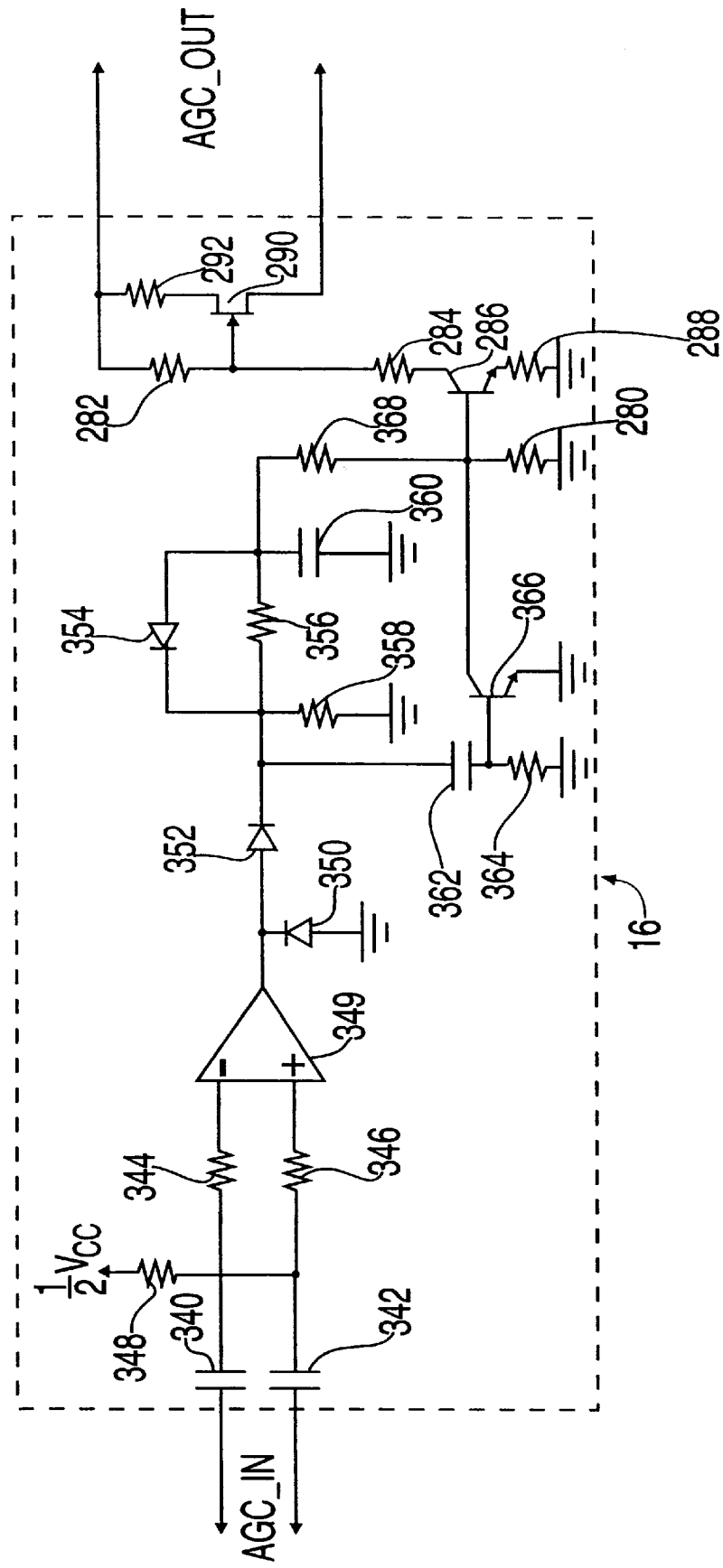
FIG. 8 is a detailed schematic diagram of an automatic gain control circuit which may be utilized within the embodiment of FIG. 1.

Magnetic core 312 generates a signal AGC_IN which is proportional to an amount of current flowing into the GFCI and provides the signal as input to pins 2 and 3 of the LM1851 228; the AGC_IN signal is also provided to the automatic gain control (AGC) circuit 16 (FIG. 8). Magnetic core 314 generates a signal which is proportional to an amount of current flowing back from the GFCI (in the neutral) and provides the signal across a capacitor 226. A first end of capacitor 226 is also connected to a second end of a capacitor 224 whose other end is connected as input to pin 4 of the LM1851 and to anode ends of diodes 256, 258. A second end of capacitor 226 is electrically connected to pin 5 of LM1851 228.

The LM1851 228 is an integrated circuit which, via its input pins, detects small differences in the current flowing through the AC-1 and AC-2 terminals, identifying ground faults thereby. Upon detection of a ground fault, the LM1851 228 conveys the fault information via the state of a signal, GFCI_OUT, provided at pin 1. Pin 1 is electrically connected to a first end of a resistor 230, a second end of which is connected to a first end of a capacitor 240 and a gate of an SCR 244. The state of the pin 1 output (i.e., signal GFCI_OUT) controls the state of SCR 244 by integrating the GFCI output. In other words, a particular level at capacitor 240, referred to as the SCR_GATE signal, controls the impedance state of the SCR. SCR_GATE defines the state of conduction within the SCR path to ground, which in turn defines the current flow from terminal AC-1 through conductive element 211, through the relay coil 260, diode 252, the conducting path of SCR 244, and resister 246;

the neutral line current flows through diode 258, element 213 to AC-2. Current flow through the coil 260 forces the relay contacts 28, 30 to an open state, cutting off power to the load and preventing a user from being injured.

AGC circuit 16 (FIG. 8) is electrically connected to the GFCI 12 across first and second ends of a resistor 232, preferably having a value of around 2 MΩ. The signal output from the AGC circuit across resistor 232, varies the sensitivity of the LM1851 228 to leakage current detected in the system. A first end of resistor 232 also is electrically connected to pins 8 and 6 of the LM1851, and the resistor's second end is connected to pin 8, a cathode end of a diode 234 and an anode end of a storage capacitor 236. Pin 7 of the LM1851 is electrically connected across a capacitor 238 to floating ground.

As mentioned above, SCR_GATE controls current flow through SCR 244, and the collector and emitter of resistor 249 of optocoupler 248 is connected across the anode and cathode ends of SCR 244. The optocoupler is responsive to an ALARM_TRIP signal, generated within the alarm circuitry 18, and provided at photodiode 251. When ALARM_TRIP goes high, i.e., an alarm condition occurs, current flows through the photodiode to ground through resistor 250. This causes the optocoupler to turn on creating an alternate path for current which bypasses the SCR and energizes the coil 260 thereby opening relay contacts 28, 30. Thus, the optocoupler serves as a backup or alternate means of tripping the relay contacts 28, 30, either when the SCR has failed or when a failure in the GFCI 12 circuitry has been detected.

Another key feature of the system 10 of this invention is its ability to dynamically adjust the leakage-current sensitivity of the GFCI circuit 12 using automatic gain control (AGC). Currently, certain appliances are not required to be protected by a GFCI because they generate undesirable parasitic ground leakage current that would interfere with the normal operation of a GFCI. Appliances such as refrigerators, dishwashers, washing machines, etc. or devices with switching power supplies in them, for example, typically use capacitors in their filter circuits. These capacitors usually are connected directly to the ground wire of the AC power line, thus generating ground leakage and causing "nuisance tripping" of the GFCI. Because the IGFCI of this invention overcomes the problems associated with such appliances, it is foreseen that IGFCIs will become a UL requirement within the same.

A preferred embodiment of an automatic gain control (AGC) circuit 16, described broadly above with reference to FIG. 1, will now be described with reference to FIG. 8. The AGC circuit 16 detects and compensates for slow rising, steady and fast rising leakage current. In other words, the AGC circuit distinguishes between fast rising leakage current caused by a human and steady or slowly rising leakage current caused by certain appliances or other devices. In a case where the leakage current steadily increases, the GFCI tracks this increase and raises its internal reference threshold level for tripping, above which an additional 5 ma will trip the GFCI. In a case of steady state or slowly rising leakage current, up to 25 ma can be compensated for by the AGC circuit 16. However, any leakage current above 30 ma will trip the GFCI. Although the quiescent or steady state sensitivity can increase, the GFCI's dynamic sensitivity does not change. At all times, 5 ma of fast rising leakage (i.e., that produced by human contact) will trip the GFCI circuit 12.

In order to receive the AGC_IN signal from the GFCI 12, first ends of capacitors 340, 342 are coupled to GFCI core 312. The capacitors prevent the AGC circuit 16 from interfering with current sensing by the GFCI 12. Second ends of capacitors 340 and 342 are electrically connected to first ends of resistors 344, 346, the second ends of which are electrically connected to inverting and non-inverting inputs to op-amp 349, respectively. The second end of capacitor 342 also is electrically connected through a resistor 348 to ½ Vcc. An output of op-amp 349 is electrically connected to cathode end of diode 350, an anode end of which is connected to ground, and an anode end of diode 352.

Cathode end of diode 352 is electrically connected to a first end of a capacitor 362, a first end of a resistor 358, a second end of which is connected to ground, a first end of a resistor 356 and a cathode end of diode 354. Anode end of diode 354 is electrically connected to a first end of a capacitor 360, a second end of which is grounded, and to a first end of a resistor 368. A second end of capacitor 362 is electrically connected to a base of NPN transistor 366 and to a first end of resistor 364, a second end of which is connected to ground. An emitter of transistor 366 is grounded while its collector is connected to a second end of resistor 368, a first end of resistor 280, a second end of which is grounded, and a base of transistor 286. An emitter of transistor 286 is connected across a resistor 288 to ground and a collector is connected across a resistor 284 to a gate of FET 290. Second end of resistor 284 is also electrically connected to a first end of a resistor 282. A second end of resistor 282 is electrically connected to a first end of a 500 Kohm resistor 292, a second end of which connects to a source of N-channel FET 292.

The signal output of amplifier 349 is rectified by diodes 350, 352, and charges capacitor 360 through resistor 356. The voltage that appears across the capacitor 360 biases the base of transistor 286 through resistors 368, 280. Collector current flowing through transistor 286 causes the equivalent impedance of FET 290 to decrease. The FET/500 Kohm resistor 292 series combination is electrically connected in parallel with the 2 MΩ threshold set resistor 232 (FIG. 7). Lowering the equivalent impedance (2 MΩ) by a factor of 5 corresponds to lowering the sensitivity of the GFCI to 25 ma. As the impedance decreases, so does the sensitivity. Consequently, it takes more current to trip the GFCI 12, i.e., the steady state reference threshold at which the GFCI will trip. For example, a steady leakage current of 1 ma causes the impedance of the FET 290 to decrease so as to raise the leakage level at which the GFCI trips to 6 ma (i.e., 1 ma steady state threshold plus 5 ma fixed dynamic threshold). A steady state leakage of 5 ma will set the FET 290 to an equivalent impedance of 1.5 MΩ. The resulting impedance sets the sensitivity of the GFCI to 10 ma (i.e., 5 ma steady state threshold plus fixed 5 ma dynamic threshold). The maximum equivalent impedance of the FET 290 will raise the steady state threshold to 25 ma. Thus, any leakage over 30 ma will trip the GFCI.

Similarly, a slowly decreasing leakage current changes the steady state threshold, above which 5 ma will trip the GFCI. A decreasing leakage current causes the output of the amplifier 349 to decrease, reverse biasing diode 352. The accumulated charge on capacitor 360 discharges through resistors 356, 358 to ground until it reaches the new level set by the output of amplifier 349. The drop in voltage across capacitor 360 causes a corresponding increase in the impedance of the FET 290, the result of the decreased collector current flowing through transistor 286. This causes a higher voltage to appear at the gate of FET 290. This higher gate voltage raises the equivalent impedance of the FET 290. The higher resistance combined with set resistor 232, in parallel with the series combination of FET 290 and resistor 292, lowers the GFCI circuit 12 threshold.

As discussed earlier, the dynamic threshold of the GFCI 12 never changes from its preset level of 5 ma. Thus, if, for example, the steady state threshold has risen from 0 ma to 10 ma due to 10 ma of leakage current present on the AC power line, the device 10 would trip on 5 ma of fast rising leakage current, the type caused by humans. To accomplish this, the GFCI circuit 12 uses transistor 366 to quickly discharge capacitor 360 and the base of transistor 286. This causes the equivalent impedance of the FET 290 to revert back to its original 5 ma sensitivity setting. Fast rising leakage current of the type that could be caused by humans causes the output of amplifier 349 to rise quickly causing current to charge capacitor 362. The voltage across resistor 364 rises with rising capacitor voltage until sufficient to turn on transistor 366. Transistor 366 turning on quickly depletes the charge on the base of transistor 286, turning it off and also quickly discharges capacitor 360.

Another important feature of IGFCI device 10 is the device's ability to constantly monitor the GFCI circuitry 12 to assure proper operation in its task to protect users against ground faults. To accomplish this task, a test circuit 14 is included to perform a built in test to perform two independent self test operations on the GFCI ensure user safety. A first self test is performed once every hour and checks that the trip coil 260 and the SCR 244 are working properly. A second test is performed once every two hours and checks that the GFCI IC 228 is working properly. First and second self test circuits will now be described with reference to FIGS. 9A, 9B, respectively.

Figure 9A:
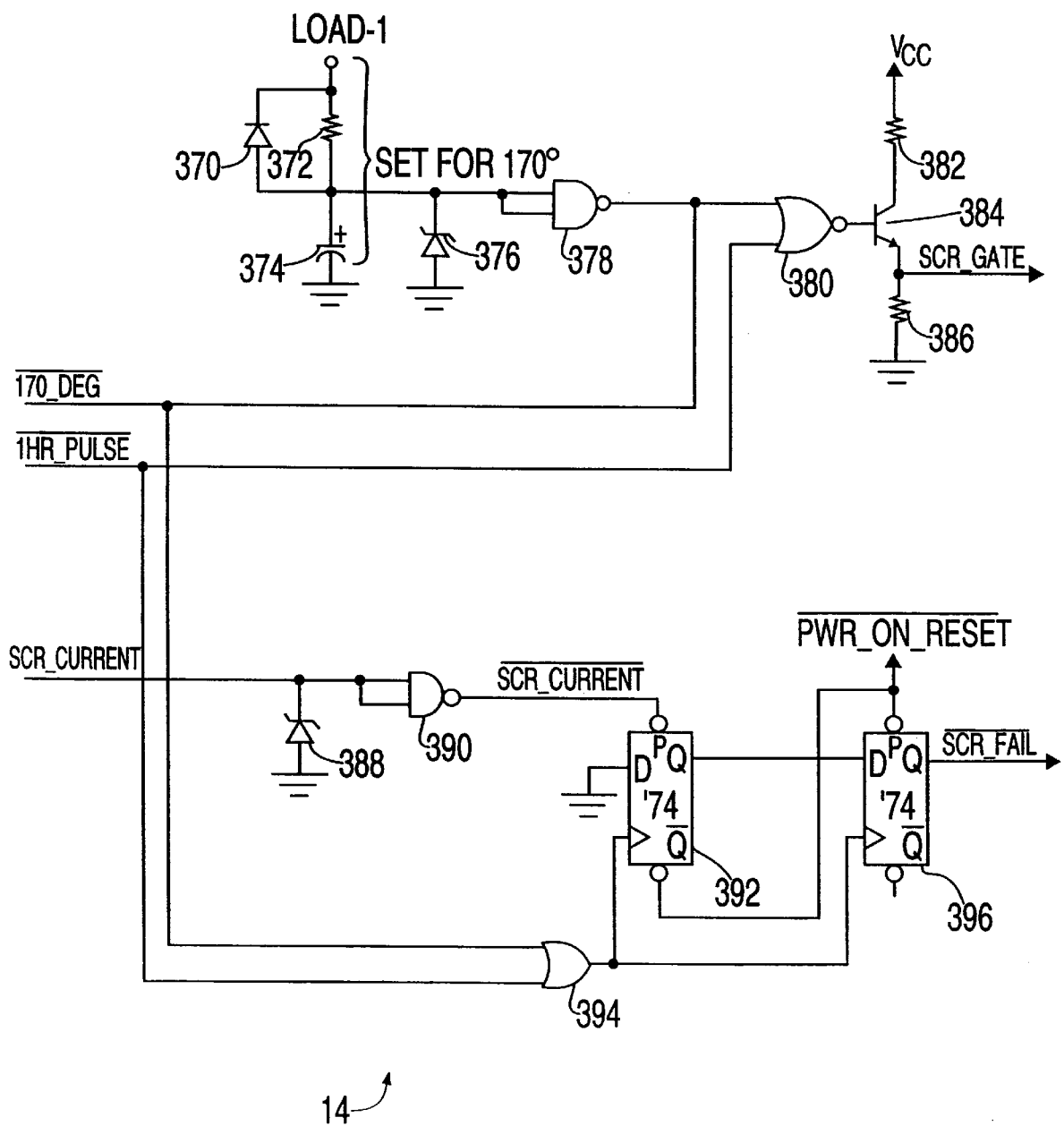
FIG. 9A is a detailed schematic diagram of a portion of self test circuitry which may be utilized within the embodiment of FIG. 1.

Referring now to FIG. 9A, a preferred embodiment of a first portion of self test circuit 14 for implementation within the present invention will be described. The first self test portion is electrically connected to GFCI 12 within which the coil 260 and SCR 244 are tested in conjunction with the 1HR_PULSE bar signal produced by the timing signal generator 22. Consequently, the SCR 244 is turned on by SCR_GATE near the end of the positive portion of the AC cycle, i.e., at approximately 170 degrees. The presence of any current flowing through the SCR 244 is detected and identified by way of the SCR_CURRENT signal. If no current is detected, the alarm is triggered and the relay switches 28, 30 are tripped by the alternate trigger means of optocoupler 248 (described above).

LOAD-1 terminal is electrically connected to a first end of a resistor 372 and a cathode end of a diode 370. Anode end of diode 370 is electrically connected to second end of resistor 372, an anode end of capacitor 374, a cathode end of a zener diode 376 and two inputs of a logical Nand circuit 378 as a 170 degree sensitive signal, 170_DEG. The 170_DEG signal is generated through the resistor 372 and capacitor 374 pair during the positive half cycle when capacitor 374 charges through resistor 372. The values are chosen so that the input to gate of circuit 378 rises high enough to cause its output to go low at approximately 170 degrees into the positive half cycle, generating the 170_DEG bar signal. Zener diode 376 simply prevents the input voltage from rising high enough to damage the gate inputs of Nand circuit 378. The output of gate circuit 378 (170_DEG bar) is a normally high signal that goes low 170 degrees into the positive half cycle of the AC and remains low up to the zero crossing.

The 1HR_PULSE signal generated within timing signal generator 22 is combined with the 170_DEG signal within a logical Nor circuit 380, an output of which is provided to a base of a transistor 384. A collector of transistor 384 is connected through resistor 382 to Vcc and the transistor's emitter is connected to ground through a resistor 386. Thus, transistor 384 only turns on when both inputs to gate 380 are low. As mentioned earlier, the 1HR_PULSE signal is approximately 75 ms long, straddling more than one cycle of the AC power. Current flowing through transistor 384 produces a voltage across resistor 386, turning on the SCR for approximately the final 10 degrees in the positive AC half cycle. During the negative half cycle, diode 370 quickly discharges capacitor 374 for the following positive half cycle.

If the trip coil 260 and the SCR 244 are functioning properly, current will flow through both of these components when transistor 384 turns on. It is at this point that the SCR_CURRENT signal, shown in FIG. 7, will be at its maximum. This signal is provided to a pair of inputs to a logical Nand circuit 390, where it is inverted to generate SCR_CURRENT bar, and to a cathode end of a zener diode 388. SCR_CURRENT bar presets a latch circuit 392 causing the latch circuit's "Q" output to immediately go high. 170_DEG bar and 1HR_PULSE signals are input to logical Or circuit 394, an output of which is provided to clock latch circuits 392, 396. A "Q" output of latch circuit 392 is electrically connected as a D input to latch circuit 396; PWR_ON_RESET bar is provided as its "preset" as well as to a "set" input of latch circuit 392. Consequently, the rising edge of the 170_DEG bar clocks the logical output of latch circuit 392 into latch circuit 396. Previously, upon power up, latch circuit 392 is reset low and latch circuit 396 is reset high. If current flows through the SCR 244, then a high is clocked into latch circuit 396 and the output, SCR_FAIL bar, remains high. The alarm, therefore, is not triggered. However, if no current is detected, then a low is clocked into latch circuit 396 and the SCR_FAIL bar signal goes low, the alarm is triggered and the relays 28, 30 are tripped by the optocoupler 248. Since the input to latch circuit 392 is tied low, a low is always clocked from the latch circuit 392 Q output. Thus, in the absence of the preset pulse derived from SCR 244 current, latch circuit Q output defaults to a low, indicating a failure with the SCR 244 and/or the coil 260.

Figure 9B:
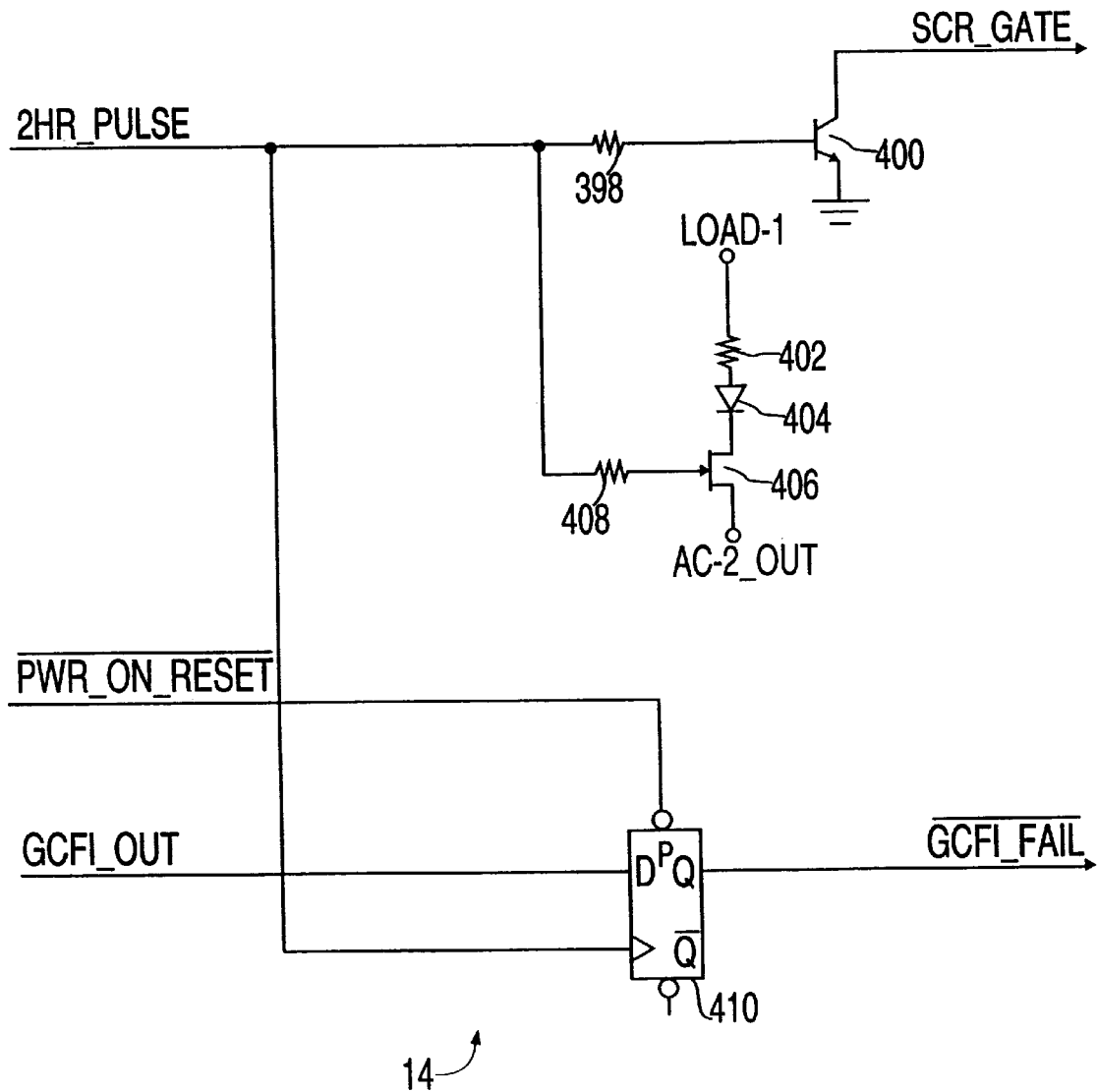
FIG. 9B is a detailed schematic diagram of a portion of the self test circuitry which may be utilized within the embodiment of FIG. 1.

Referring now to FIG. 9B, a preferred embodiment of a second portion of self test circuit 14 will be described. The 2HR_PULSE signal generated within timing signal generator 22 is provided to the clock input to a latch circuit 410. The clock input is also electrically connected to a first end of resistors 398, 408. A second end of resistor 398 is electrically connected to a base of NPN transistor 400, an emitter of which is grounded and a collector of which provides a path out for the SCR_GATE signal. A second end of resistor 408 is electrically connected to a gate of N-channel FET 406. A source of FET 406 is electrically connected to terminal AC-2_OUT, a drain of which is electrically connected to a cathode end of a diode 404. An anode end of diode 404 is connected to terminal LOAD-1 through a resistor 402. GFCI_OUT and PWR_ON_RESET are provided as "D" and "preset" inputs to latch circuit 410, respectively.

The second self test is preferably performed every two hours and checks for the proper operation of the LM1851 228, the timer 114 and the GFCI 12, utilizing the 2HR_PULSE signal produced by the timing signal generator 22. The 2HR_PULSE signal activates FET 406 to simultaneously simulate a ground fault, prevent the SCR 244 from firing and detect the output of the GFCI 12. The high state of the 2HR_PULSE signal turns on transistor 400 through resistor 398, clamping the gate of the SCR 244 to ground, and activates n-channel FET 406 through resistor 408, allowing current to flow during the positive half cycle from the LOAD-1 terminal to the AC-2_OUT terminal through resistor 402 and diode 404, creating an imbalance in the current flowing through the magnetic cores 312, 314. If the GFCI 12 is working properly, it will detect the imbalance created by the simulated ground fault and output a pulse on pin 1 (GFCI_OUT) of the timer 228.

The GFCI_OUT signal is input to the latch circuit 410 whereby a rising edge of the 2HR_PULSE bar signal clocks it into the latch circuit as its "D" input. In consequence, the circuit's "Q" output, GFCI_FAIL bar remains high (if operation was proper). However, if the GFCI_OUT signal is low, the GFCI_FAIL bar signal goes low, triggering the alarm and tripping the relay contacts 28, 30 through the optocoupler 248. The "Q" output of the latch 410 is normally high, being preset high by the PWR_ON_RESET bar signal upon initial application of the AC power. The SCR is prevented from firing during the test by the clamping action of transistor 400. The gate of SCR 244 is held close to ground potential by transistor 400 preventing SCR 244 from turning on while the test is in progress. In other words, no response to the simulated ground fault is utilized by the test.

It should be noted that as defined herein, slowly rising leakage current is defined as that leakage current typically associated with certain appliances such as washers, dishwashers, etc. Quickly changing leakage current is identified as such changes in current that are indicative of a ground fault, e.g., greater than 5 ma. for a set time period.

The embodiments of the invention disclosed in the present specification, drawings and claims are presented merely as examples of the invention. Other embodiments, forms, or modifications thereof will readily suggest themselves and are contemplated as coming within the scope of the present invention.

What is claimed is:

1. An intelligent circuit interrupt system electrically disconnecting a load from a source of AC power upon detection of any interrupt condition, comprising:

a. circuit interrupt means including line and load side phase and neutral ports, wherein said line side phase and neutral ports are electrically connection, respectively, to phase and neutral terminals of said AC power source and said circuit interrupt means generates an interrupt signal for interrupting said AC power flow upon the detection of said interrupt condition;

b. a relay switch including a relay tripping coil and phase and neutral contacts, wherein line and load ends of said phase contact are electrically connected, respectively, between said interrupt means load side phase port and a phase terminal of said load and the line and load ends of said neutral contact are electrically connected, respectively, between said interrupt means load side neutral port and a neutral terminal of said load and said relay tripping coil is electrically coupled between said load ends of said phase and neutral contacts for controlling said contacts in response to said interrupt signal;

c. an open-contact miswiring detector (OCMD) electrically connected to said line and load ends of one of said phase and neutral contacts for detecting a miswiring condition when said contacts are in an open state;

d. a closed-contact miswiring detector (CCMD) electrically connected to said load end of said phase contact and to said line and load ends of one of said phase and neutral contacts for detecting a miswiring condition when said contacts are in a closed state;

e. a timing signal generator electrically connected to said open and closed contact miswiring detectors for generating system timing signals;

f. a test circuit electrically couple to said interrupt means and responsive to said timing signal generator for regularly testing said interrupt means operability;

g. an alarm circuit electrically responsive to each of said test circuit, said timing signal generator, said open-contact miswiring detector and said closed-contact miswiring detector for producing an alarm signal communicating at lease one of an open-contact miswiring condition, a closed-contact miswiring condition, an operational failure condition and a need for external testing condition;

h. a power supply electrically connected between said load ends of said phase and neutral contacts and to said timing signal generator;

i. control means coupled to said circuit interrupt means to receive said interrupt signal and coupled to said relay tripping coil to provide operating current to said relay tripping coil when said control means is conducting current;

j. alternative control means coupled to said alarm circuit to receive said alarm signal and to said relay tripping coil to provide operating current to said relay tripping coil in the event that said control means fails to operate.

2. An intelligent circuit interrupt system, as defined in claim 1, wherein said alternative control means is an optoelectronic switch.

3. An intelligent current interrupt system, as defined in claim 2, wherein said optoelectronic switch comprises a photo diode and a phototransistor.

4. An intelligent current interrupt systems, as defined in claim 3, wherein said alarm signal is coupled to said photo diode to cause said photo diode to emit light which is received by said phototransistor and said phototransistor is made conductive to supply operating current to said relay tripping coil.

* * * * *